(12) United States Patent
Howell, Jr.

(10) Patent No.: US 10,667,509 B2
(45) Date of Patent: Jun. 2, 2020

(54) GAME FEEDER HOIST AND HUNTING STAND

(71) Applicant: Kenneth Howell, Jr., Des Allemands, LA (US)

(72) Inventor: Kenneth Howell, Jr., Des Allemands, LA (US)

( * ) Notice: Subject to any disclaimer, the term of this patent is extended or adjusted under 35 U.S.C. 154(b) by 0 days.

(21) Appl. No.: 15/727,701

(22) Filed: Oct. 9, 2017

(65) Prior Publication Data

US 2019/0104728 A1    Apr. 11, 2019

(51) Int. Cl.
*A01M 31/02*    (2006.01)
*A01K 5/00*    (2006.01)

(52) U.S. Cl.
CPC .............. *A01M 31/02* (2013.01); *A01K 5/00* (2013.01)

(58) Field of Classification Search
CPC ..................................................... A01M 31/02
USPC ......................................................... 254/343
See application file for complete search history.

(56) References Cited

U.S. PATENT DOCUMENTS

| | | | |
|---|---|---|---|
| 5,394,957 A * | 3/1995 | Doby .................... | A01M 31/02 108/152 |
| 5,395,284 A * | 3/1995 | Frisk ....................... | A22B 5/06 452/187 |
| 5,720,400 A * | 2/1998 | Altizer, Sr. ........... | B60P 1/5471 212/180 |
| 6,325,174 B1 * | 12/2001 | Lamar ................... | A01M 31/02 182/116 |
| 7,191,732 B2 * | 3/2007 | Neal, Jr. ............... | A01K 5/0225 119/51.01 |
| 7,216,849 B2 * | 5/2007 | Tremblay ............... | B60P 7/083 24/69 ST |
| 8,496,283 B1 * | 7/2013 | Schmeichel ............. | B60J 7/085 296/100.16 |
| 10,015,957 B1 * | 7/2018 | Fast ...................... | A01M 31/02 |
| 2009/0078500 A1 * | 3/2009 | Wydner ................ | A01M 31/02 182/3 |
| 2011/0181018 A1 * | 7/2011 | Bruneau ................... | B60P 3/10 280/414.1 |
| 2011/0260127 A1 * | 10/2011 | Surgeon .................... | B66D 3/20 254/362 |
| 2012/0299339 A1 * | 11/2012 | Birch .................... | A01M 31/02 297/188.01 |

* cited by examiner

*Primary Examiner* — Alvin C Chin-Shue
(74) *Attorney, Agent, or Firm* — Norton IP Law Firm; Taylor M. Norton

(57) ABSTRACT

A portable game feeder hoist and hunting stand is provided with an upstanding support member connected to a horizontal support arm that is attachable to a tree with a chain. The game feeder hoist has a winch that is removably attached to the horizontal support arm, from which a hoist line extends. The winch preferably includes a worm gear meshed with a worm screw operatively coupled to a worm screw shaft configured to removeably connect to a receiving socket, which is adapted to securely receive a keyed end of an elongated drive shaft, in a lock and key style arrangement. A tree sizing strap and hook apparatus is provided with graphic identification markers to aid hunters in accessing the size of tree trunks from which they intend to mount a game feeder hoist and hunting stand. The strap includes a hook from which to temporarily hang the portable game feeder hoist against the tree trunk while attaching the hoist to the tree with a chain.

12 Claims, 14 Drawing Sheets

GAME FEEDER HOIST AND HUNTING STAND

BACKGROUND OF THE INVENTION

Field of the Invention

The present invention generally relates to wild game hoists and more particularly relates to a game feeder hoist and hunting stand.

Description of the Related Art

The need and desire to feed wildlife has always existed for people who love nature and have an interest in animals. Over the years, this demand has resulted in the invention of many different types of animal feeders, most of which provide a storage container for the food or a system for elevating and dispensing the food to animals over a period of time.

Although many people utilize wildlife feeders for the sole purpose of providing supplemental food to animals during stressful times, the primary use is to attract and hold wildlife, mainly deer, within a certain area for the purposes of hunting, photographing, or just observing.

Hunters and observers of game animals such as deer and hogs have long realized the importance of gaining elevation from ground level to get above the animal's line of sight, to avoid detection by the animal's keen sense of smell, and to increase the hunter or observer's visibility of the area. Load supporting stands are commercially available for climbing and remaining perched at an elevation upon a tree trunk, utility pole or like structure.

Game feeders such as ones used to disperse corn to deer are often set up in remote wooded areas. These feeders are most commonly made with a drum which houses corn and includes a motor to dispense the corn at determined time intervals. Therefore, a portable, compact, lightweight hoisting device is desirable for lifting and lowering game feeders in remote settings, Therefore, there is a current need for a portable, compact, lightweight hoisting device or system which can easily be attached to a tree and operated by a single individual.

When hunting large game such as deer, it is often times desirable and necessary to dress a fallen animal in the field. There are many advantages to field dressing. For example, by leaving behind the unwanted portions of the animal in the field you considerably reduce the overall weight for transportation of the desirable remains. Furthermore, prompt gutting decreases the temperature around the desirable meat reducing the chance of meat spoilage. While field dressing of game animals is desirable, it also requires that a person have means to elevate the fallen animal so that the exposed meat does not get soiled and contaminated. Often times the fallen animal is deep into wooded areas inaccessible by vehicle means. Therefore, there is a need for a portable, compact, lightweight hoisting device or system which can easily be attached to a tree and operated by a single individual.

A conventional apparatus is disclosed in U.S. Pat. No. 5,820,455 to Breedlove (1998) providing a portable game hoist comprising a vertical member, a horizontal member, and a diagonal member. One disadvantage of this device is that the bottom portion of the hoist is not strapped to the tree. Instead, a sharp bracket attached to the bottom of the hoist engages the tree. If the hoist is bumped or bounces for any reason, the hoist could slide by the supporting post causing hoist failure. Also, some assembly is required at the point of use which may require the need for tools. Furthermore, the rope and pulley system described does not have a locking feature to prevent sudden hoist failure if hands slip from the rope. Also, hoisted items must be tied off to a near by tree or the like in order to hold the lifted weight. Such devices are complex in construction and inconvenient in use.

U.S. Pat. No. 6,045,442 to Bounds (2000) is a game hoist comprising two vertical supports, two horizontal supports, and a diagonal support. One disadvantage of Bound's device is that the large size of the device does facilitate easy transport. A compact unit is oftentimes needed for field dressing of fallen game in dense locations. Secondly, because the winch is separated from the main frame and positioned near ground elevation level in order to accessibly operate the winch, more set up time is required. When a hoisting device is primarily used for field dressing of fallen game, it is continuously being set up and taken down. Therefore, it is desirable to have a hoisting apparatus which minimizes the amount of set up and take down time required. Finally, the height of the gambrel in the maximum hoisted position is considerably lower than the uppermost horizontal member. The primary shortcomings are complexity of construction, inconvenience in operation, and accessibility of the winch to unauthorized persons, such as trespassers, as well as to menacing wild animals such as hogs.

U.S. Pat. No. 6,062,974 to Williams (2000) is a portable game support consisting of a upper arm and a lower arm. While in use, the upper arm is horizontal and is attached to a vertical columnar structure via a chain. The lower arm is diagonal and has two spikes to engage the tree or pole. The problem with William's game support is that the lower arm is not chained or strapped to the vertical columnar member; therefore, if the device is bumped or bounces for any reason, the lower arm could slide down the vertical columnar member causing the hoisted item to drop violently.

More recently, U.S. Pat. No. 6,695,688 (2004) to James an Alva Owens is a portable hoist designed to be attached to a tree or pole comprising a vertical member and a pivoting support arm. The pivoting support arm is near horizontal while in use. One disadvantage of this device is that the winch must be operated by hand at an elevation accessible to unauthorized persons as well as accessible to wild game. Also, a winch can easily fail if the winch gear locking lever is accidentally disengaged while under load. If this occurs, the load will drop immediately, possibly causing injury to person(s) tending to the lifted object. Another disadvantage of Owens' device is the lack of a diagonal support member which distributes part of the load back to the vertical columnar structure. Without a diagonal support or other means to distribute load, the removable bolt or ball pin is the main means for support. Over time the pin could shear, causing hoist failure.

More recently, U.S. Pat. No. 7,913,980 (2011) to Shawn Michael Cipriano is a portable hoist designed to be attached to a tree or pole comprising a vertical member and a pivoting support arm connected by a pivot pin. Over time the pivot pin could shear, causing hoist failure and the load will drop immediately, possibly causing injury to person(s) tending to the lifted object. It also includes a complex pulley system, to be pulled by a user's hands, giving rise to ropes burns and possible strain on a user's body. Another disadvantage of this device is that the complicated must be operated by hand at ground elevation where such is accessible to unauthorized persons as well as accessible to wild game.

Any and all above referenced patents are incorporated herein by reference.

While these units may be suitable for the particular purpose employed, they would not be as suitable for the purposes of the present invention as disclosed hereafter.

Accordingly, there is a need for a compact, portable, lightweight game feeder hoisting device and hunting stand or system which can easily be attached to a tree by and operated by a single individual.

As disclosed in this application, the inventor has discovered novel and unique devices and methods for simple and efficient mounting of hoisting devices, lifting of feeder equipment, and providing of hunting stands, which exhibit superlative properties without being dependent on heavy, immobile, expensive or complex components.

Embodiments of the present invention provide for devices and methods and disclosed herein and as defined in the annexed claims which provide for improved mounting and hoisting features in order to efficiently attach a portable game feeder hoist to a variety of structures, and lift a variety of hunting equipment, in a safe manner, for people's health, safety and well-being.

Embodiments of the present invention provide for hunting stands and mounting methods as defined in the annexed claims which provide for improved mobility, set up, and attachment characteristics in order to efficiently attach the stands to various types of structures of interest in a multitude of environments.

SUMMARY OF THE INVENTION

It is one prospect of the present invention to provide one or more novel devices of simple but effective construction which can be applied to many environments to efficiently and effectively elevate wild game feeders for hunting.

It is another object of the invention to provide for a lightweight portable hoist for hoisting game feeders while also providing means to assist in the hunting process. It is a further object of the present invention to provide for a portable game feeder hoist and hunting stand aid which may be mounted to a tree, post or other substantial vertical object. It is yet another object of the invention to provide tree sizing straps to assist hunters in making visual estimations of the sizes of trees.

Still another object of the invention is to provide for a portable game feeder hoist system having a winch apparatus for hoisting the game feeder into position, which may also be employed to provide mechanical advantages to a user by assisting in the process of mounting the hoist to a tree and by providing a removable deer hunting stand for the hunting process.

The following presents a simplified summary of the present disclosure in a simplified form as a prelude to the more detailed description that is presented herein.

Therefore, in accordance with embodiments of the invention, there is provided a portable game feeder hoist comprising an upstanding support member having an upper end and a lower end and at least one opposing pair of lateral support arms rigidly connected to the upstanding member, where each arm laterally extends outwardly rearwardly and transitions inwardly forwardly to form a lateral support elbow for the upstanding support member, to facilitate lateral stability when attached to a tree or other type of pole. Preferably, at least one chain mount is rigidly connected to the upstanding support member and is configured to secure a chain, which encircles a tree trunk, to the upstanding support member. Preferably, at least one loop mounting member is connected to the upper end of the upstanding support member and is adapted to receive a hook from which to temporarily hang the hoist while mounting the hoist to a tree. A horizontal support arm is rigidly connected to the upstanding support member and extends outwardly forwardly from the tree trunk when the hoist is attached to the tree. A winch is removeably attached to the horizontal support arm, and the winch has a hoist line that preferably extends horizontally from the winch through a pulley that is operatively connected to the horizontal support member. The hoist line has a hanger, such as an eyelet or a hook, at a distal end of the hoist line, for connecting to hunting equipment, such as a deer feeder or an ATV, to lift or elevate the equipment when the winch is rotated to wind the hoist line thereon.

Preferably, the portable game feeder hoist further comprises a hunting stand, and the hunting stand has an elongated vertical support member telescopically received in the upstanding support member; the portable game feeder hoist has a platform connected to the elongated vertical support member and it extends outwardly forwardly therefrom; and the portable game feeder hoist preferably has a vertical brace arm rigidly connected to a part of the forwardly disposed platform, and the brace arm rests downwardly upon a portion of the horizontal support arm.

The hunting platform is preferably telescopically connected to the elongated vertical support member for extending the platform outwardly from a tree trunk when the hoist is mounted to the tree.

In a preferred embodiment, the portable game feeder hoist also has a seat support member pivotally connected to the platform by a pivoting connecting member.

The portable game feeder preferably has a winch comprising a worm gear meshed with a worm screw operatively coupled to a worm screw shaft configured to removeably connect to a receiving socket, and the receiving socket is adapted to securely receive an end of an elongated drive shaft. Preferably, the end of the drive shaft is keyed to fit within the receiving socket in a lock and key style arrangement.

In a preferred embodiment, the portable game feeder hoist further comprises a cone guide and receiving socket adapted to receive a distal end of an elongated drive shaft member.

Preferably, the portable game feeder hoist comprises an elongated drive shaft member adapted to drive the winch when mounted to the tree and positioned at a height sufficiently out of reach of a standing person.

In yet another embodiment, the portable game feeder hoist has a plurality of elongated drive shaft members adapted to connect to each other to form an extension to drive the winch when mounted to said tree and positioned at a height sufficiently out of reach of a standing person.

In yet another preferred embodiment, the portable game feeder hoist has a tree sizing strap having a hook attached to it for temporarily mounting the hoist to a tree, and the strap is configured to encircle a trunk of the tree and to overlie itself in such encircled position. Preferably, the tree sizing strap has graphic identification markers affixed to an outer surface of the strap, and the markers have a plurality of visual zones wherein each visual zone includes a physical range of measurement and a color that differ from other ones of the visual zones for visual identification of diameter characteristics of the tree trunk.

In yet another embodiment, the portable game feeder hoist comprises a solar charged spotlight that is removeably fitted at a distal end of the horizontal support arm. The spotlight is preferably operated by motion, so as to light up an area beneath said portable game feeder hoist upon arrival of persons or wild game.

In yet another embodiment, the winch of the portable game feeder hoist comprises an electrically driven motor that is powered by a battery which is electrically connected to a solar panel for charging the battery.

In another preferred embodiment, a game feeder hoist and hunting stand system comprises an upstanding support member having an upper end and a lower end and at least one loop mounting member connected to the upper end of the upstanding support member, and the loop mounting member is adapted to receive a hook from which to temporarily hang the game feeder hoist while mounting the system to a tree. Preferably, a horizontal support arm is rigidly connected to the upstanding support member extending outwardly forwardly therefrom. In a preferred embodiment, a winch is removeably attached to the horizontal support member, and the winch has a hoist line extending horizontally from the winch through a pulley that is operatively connected to the horizontal support member. In another embodiment, the winch is rigidly attached to the horizontal support member. The hoist line has a hanger at a distal end thereof, and the hanger is adapted to attach to a game feeder in order to elevate and lower the game feeder when the winch is rotated to wind the hoist line thereon or release the hoist line therefrom.

Preferably, the game feeder hoist and hunting stand system has a hunting stand platform having a vertical support member which is telescopically received and disposed within the upstanding support member. The platform preferably has a pivoting support member pivotally connected atop the platform, and the pivoting support member transitions to a seat support member. The seat support member has a proximal end opposite a distal end, wherein the proximal end has at least one opposing pair of lateral support arms rigidly connected to the proximal end of the seat support member, and each arm laterally extends outwardly rearwardly for engaging an adjacent segment of the tree trunk. A seat is slidably upheld by the seat support member.

In a preferred embodiment, the game feeder hoist and hunting stand system has at least one chain mount rigidly connected to the upstanding support member and configured to secure a chain adapted for releaseably encompassing the tree trunk. In yet another preferred embodiment, the game feeder hoist and hunting stand system comprises a tree sizing strap having a hook configured to engage the loop mounting member for temporarily mounting the hoist to a tree. The strap is preferably configured to encircle a trunk of the tree and to overlie itself in the encircled position. The strap preferably includes graphic identification markers affixed to an outer surface of the strap, and the markers have a plurality of visual zones wherein each visual zone comprises a physical range of measurement and a color that differ from other ones of the visual zones for visual identification of diameter characteristics of the tree trunk.

In yet another preferred embodiment of the invention, a portable tree stand system is provided having an upstanding support member having an upper end and a lower end, at least one opposing pair of lateral support arms rigidly connected to said upstanding member wherein each arm laterally extends outwardly rearwardly and transitions inwardly forwardly to form a lateral support elbow for the upstanding support member. Preferably, at least two chain mounts are rigidly connected to the upstanding support member and are configured to secure a chain to the upstanding support member. The portable tree stand system includes a chain having a first end and a second end. The first end of the chain is secured to the first chain mount on one first side of the upstanding support member, and the second end of the chain is removeably secured to the second chain mount which is disposed upon the other, second side of the upstanding support member, for releaseably encompassing a tree trunk.

In one embodiment, the winch is an electrically driven motor powered by a battery electrically connected to a solar panel for charging said battery.

Preferably, at least one loop mounting member is connected to the upper end of the upstanding support member and is adapted to receive a hook from which to temporarily hang the upstanding support member while mounting the upstanding support member to a tree.

In a preferred embodiment, a horizontal support arm is rigidly connected to the upstanding support member, from which the horizontal support arm extends outwardly forwardly therefrom.

Preferably, the portable tree stand system includes a removeable hunting stand platform having an elongated vertical support member that is preferably telescopically received in the upstanding support member, which preferably has a tubular shape, and the platform extends outwardly forwardly from the upstanding support member. Preferably, a vertical brace arm is rigidly connected to a part of the forwardly disposed platform, and the vertical brace arm rests downwardly upon and is supported by a portion of the horizontal support arm.

In a preferred embodiment, the platform is telescopically connected to the elongated vertical support member for extending the platform outwardly from the tree trunk when the hoist is mounted to the tree. The hunting stand preferably includes a seat support member that is pivotally connected to the platform by a pivoting connecting member for pivoting the seat upward to a seated position and folding the seat downward to a flat resting position such as a transport position, such that the hunting stand is ready to be easily transported by the user.

In another embodiment, there is provided a tree sizing strap for mounting hunting equipment, such as a game feeder hoist and hunting stand or a portable tree stand, and the tree sizing strap is an elongated flexible strap configured to encircle a trunk of a tree and to overlie itself in such encircled position. The strap has a proximal end opposite a distal end and an inner surface relative to an outer surface in the encircled position. Preferably, there are graphic identification markers affixed to the outer surface of the strap having a plurality of visual zones wherein each visual zone includes a physical range of measurement relative to the proximal end of the strap and a color that differ from other ones of the visual zones. In a preferred embodiment, a hook is operatively connected to the proximal end of the flexible tree sizing strap and is adapted to receive hunting equipment such as a portable game feeder hoist.

In yet another embodiment, the outer surface of the strap has a Velcro liner, and the inner surface has a Velcro liner that is adapted to mate with the outer surface Velcro liner, for maintaining an encircled position around the tree trunk.

In one preferred embodiment, the plurality of visual zones includes a first visual zone and a second visual zone configured such that, in the encircled position, the first visual zone overlapping the proximal end of the strap signifies an excessive tree trunk size relative to the mounting ability characteristics of the hunting equipment, such as the length of chain attached to the game feeder hoist. Preferably, the second visual zone overlapping the proximal end signifies adequate tree trunk size relative to such mounting ability characteristics of the hunting equipment. The characteristics of said hunting equipment include a length of chain fixed to a game feeder hoist or hunting stand.

In yet another embodiment, the plurality of visual zones includes a first visual zone, a second visual zone, and a third visual zone. The first, second, and third visual zones are configured such that, in the encircled position, the first visual zone overlapping the proximal end signifies excessive tree trunk size relative to mounting ability characteristics of the hunting equipment; the second visual zone overlapping the proximal end signifies adequate tree trunk size relative to mounting ability characteristics of said hunting equipment; and the third visual zone signifies insufficient tree trunk size relative to mounting ability and requirement characteristics of the hunting equipment. Preferably, each of the visual zones is a different color. In a preferred embodiment, one of the visual zones is red, one of the visual zones is green, and one of the visual zones is yellow.

In yet another embodiment, a portion of the inner surface of the tree sizing strap includes a slick liner surface disposed between the proximal end and an approximate midpoint between the proximal and distal ends of the strap.

In a preferred embodiment, a portion of the inner surface of the distal end of the tree sizing strap lacks mating Velcro thereby preventing the strap from maintaining an encircled position around the trunk when the circumference of the trunk is characterized as having a length greater than or equal to the length of the tree sizing strap less the portion of the inner surface of the distal end.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending substantially upwardly and downwardly). A "horizontal axis" means an axis parallel to the ground (or put another way, an axis extending substantially laterally).

In accordance with embodiments of the invention, there is provided a portable game feeder hoist, hunting stand and tree sizing strap for removably connecting the hoist and hunting stand to a tree and elevating a game feeder above the ground, to attract game and to aid the hunting process, while reducing accessibility of the hoist and hunting stand to unauthorized persons or wild game by exceeding the reach of a standing person or wild animal when mounted to a tree.

Referring initially to FIGS. 1-6, the basic constructional details and principles of operation of embodiments of a portable game feeder hoist and hunting stand 100 according to a preferred embodiment of the present invention will be discussed.

Figure 1:
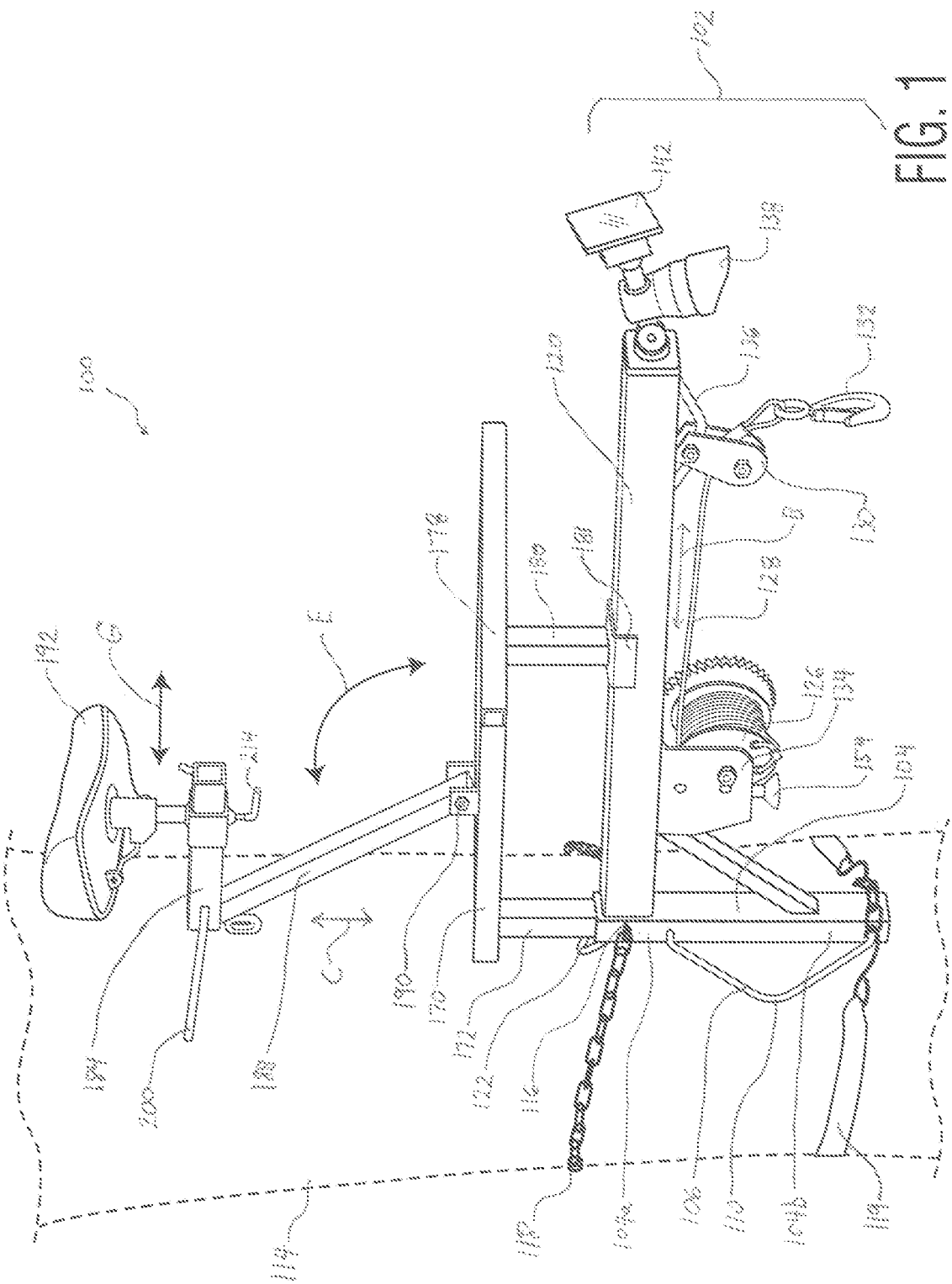
FIG. 1 is a front left perspective view of a game feeder hoist and hunting stand having a seat in first position, shown as mounted to an exemplary tree trunk, in accordance with embodiments of the invention.
Figure 2:
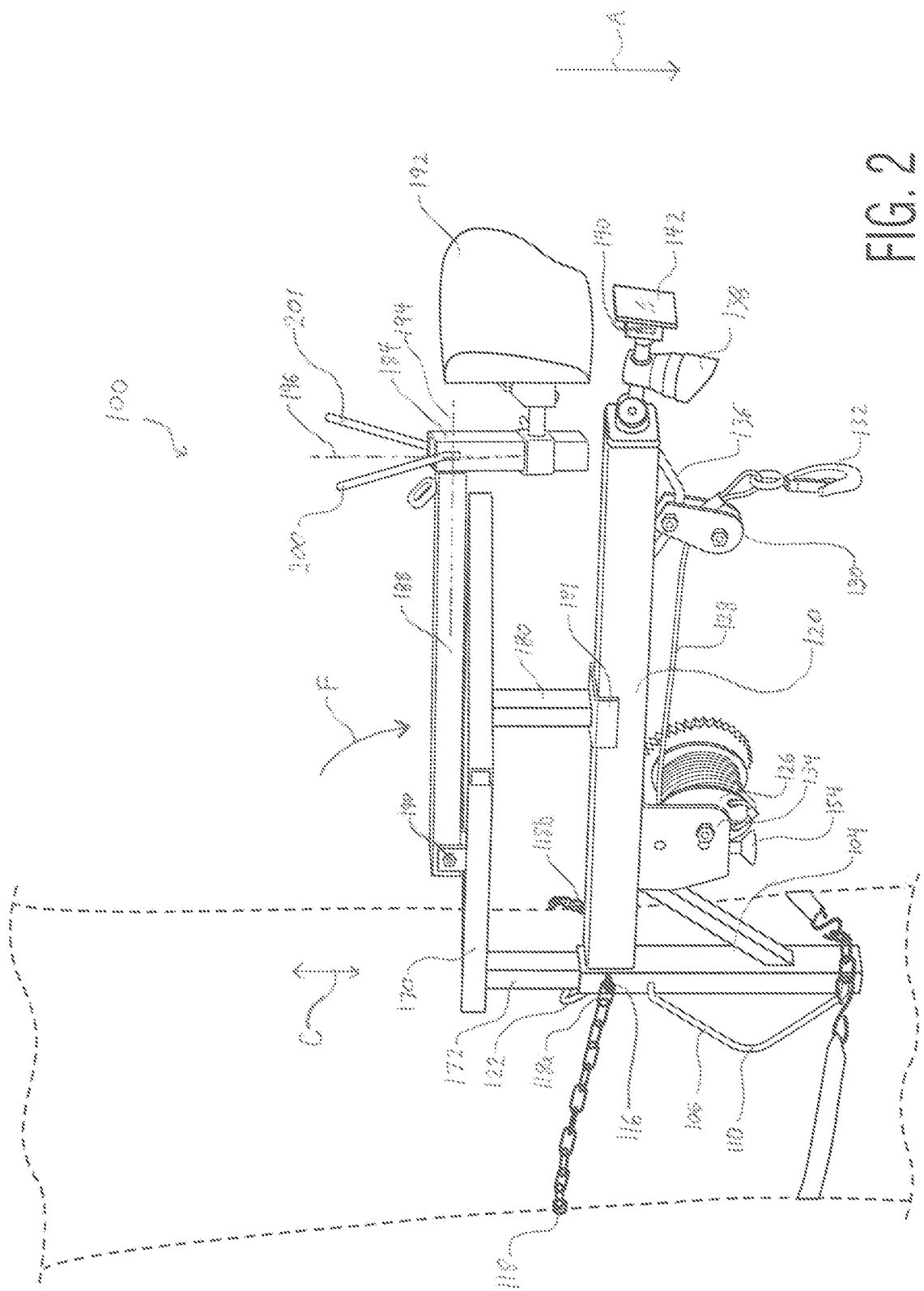
FIG. 2 is a front left perspective view of a game feeder hoist and hunting stand having a seat in second position, shown as mounted to an exemplary tree trunk, in accordance with embodiments of the invention.
Figure 3:
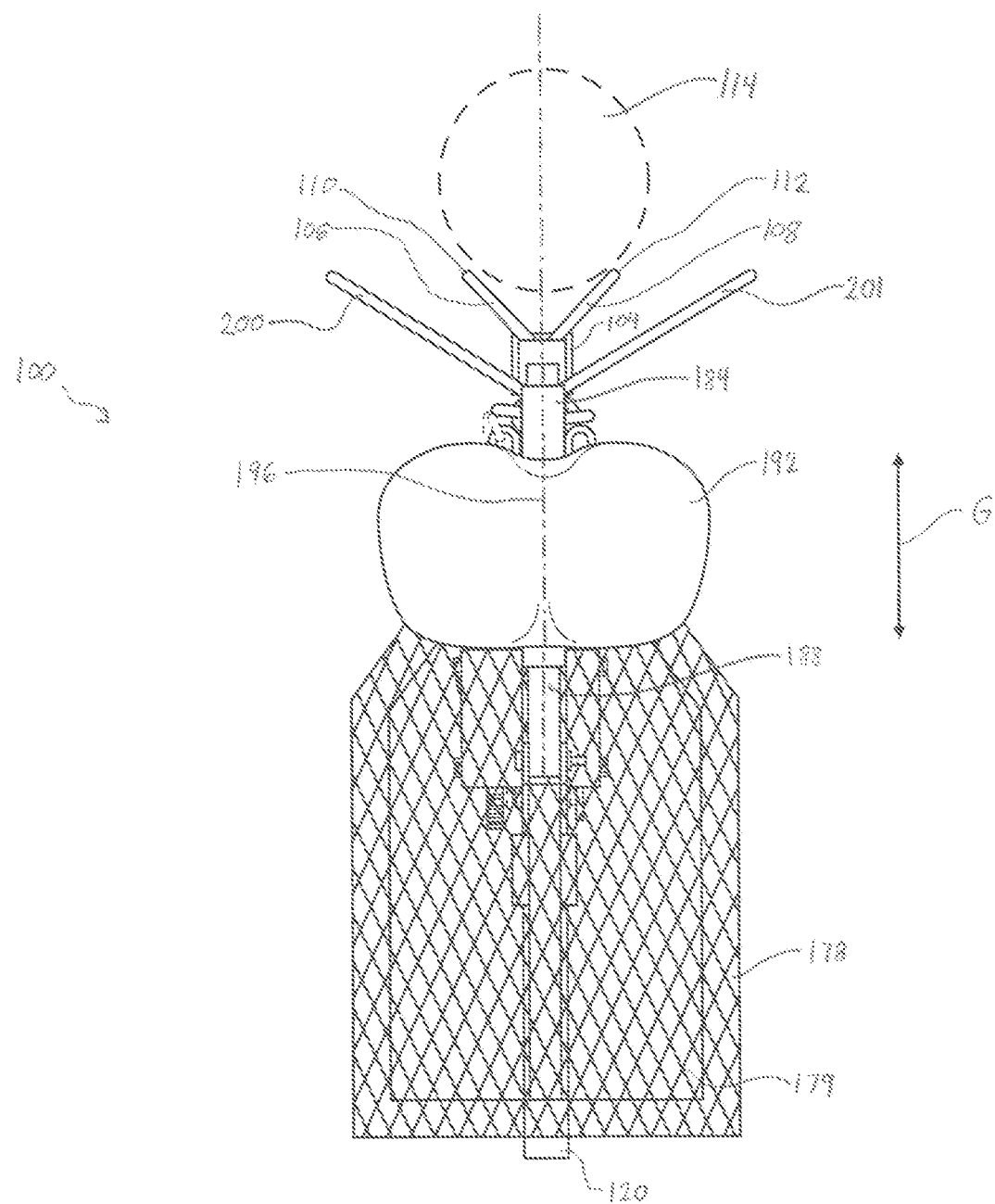
FIG. 3 is a top view of a game feeder hoist and hunting stand and exemplary tree trunk in accordance with embodiments of the invention.

A portable game feeder hoist and hunting stand 100 according to a preferred embodiment of the present invention is provided. As illustrated in FIGS. 1-6, embodiments of the invention include a portable game feeder hoist 102 comprising an upstanding support member 104 having an upper end 104a and a lower end 104b and at least one opposing pair of lateral support arms 106, 108 rigidly connected to the upstanding support member 104. As seen in FIGS. 1-3, each support arm 106, 108 laterally extends outwardly rearwardly and transitions inwardly forwardly to form a respective lateral support elbow 110, 112 for the upstanding support member 104, to facilitate lateral stability for the game feeder hoist when attached to a tree 114 or other type of pole 114. Embodiments of the invention obviate the need for piercing the trunk of the tree with sharp penetrating pointed objects or blades in order to provide stability when mounted to a tree. Preferably, at least one chain mount 116 is rigidly connected to the upstanding support member 104 and is configured to secure a chain 118, which releaseably encompasses a tree trunk 114, to the upstanding support member 104, as seen in FIGS. 1-2. The chain mount 116 preferably secures one end 118a of the chain 118. A second chain mount 117 fixed to the portable game feeder hoist 102 is configured to releaseably secure a second end 118b of the chain 118.

Figure 4:
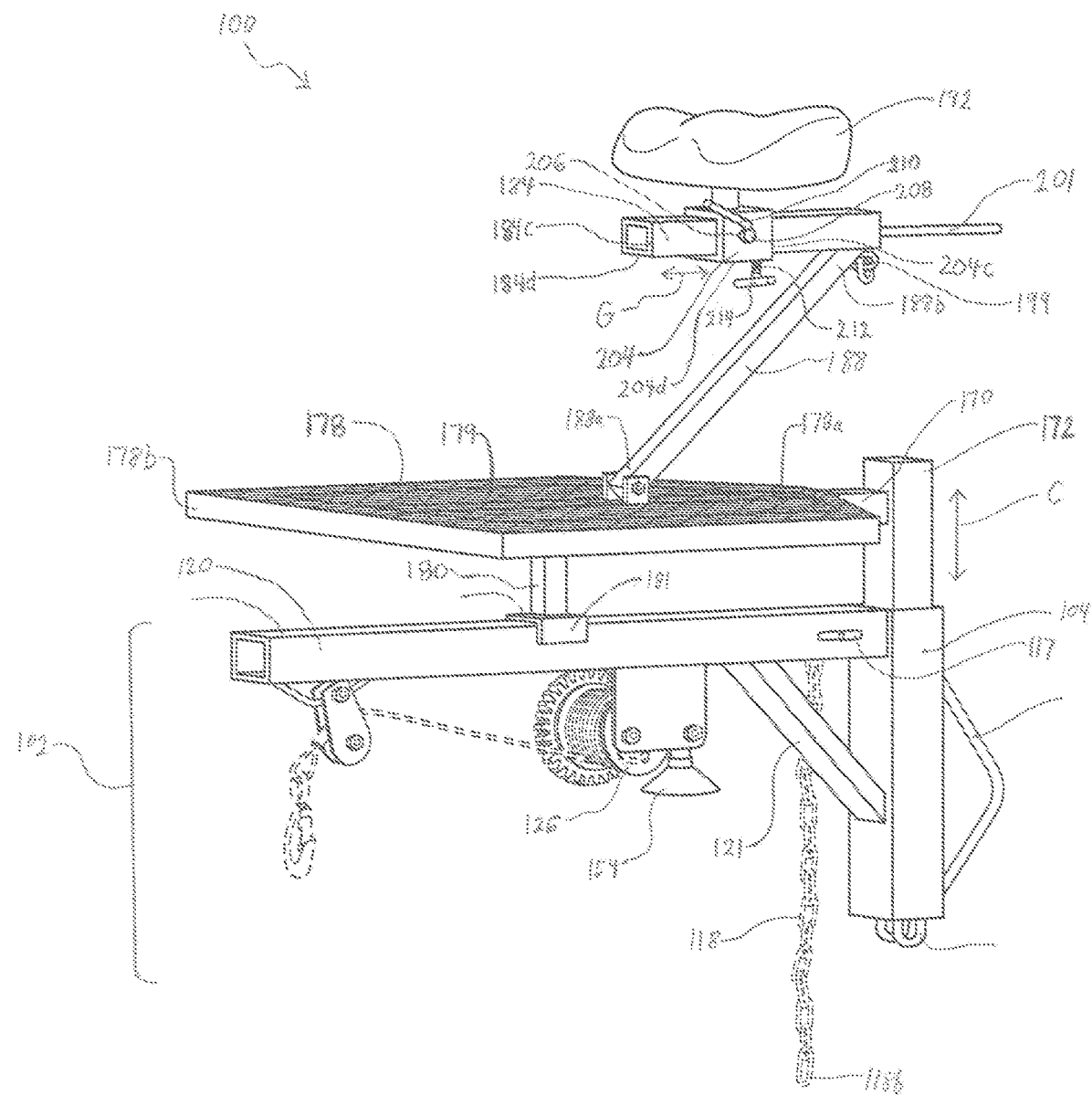
FIG. 4 is a front right perspective view of a game feeder hoist and hunting stand having a seat in another position in accordance with embodiments of the invention.
Figure 6:
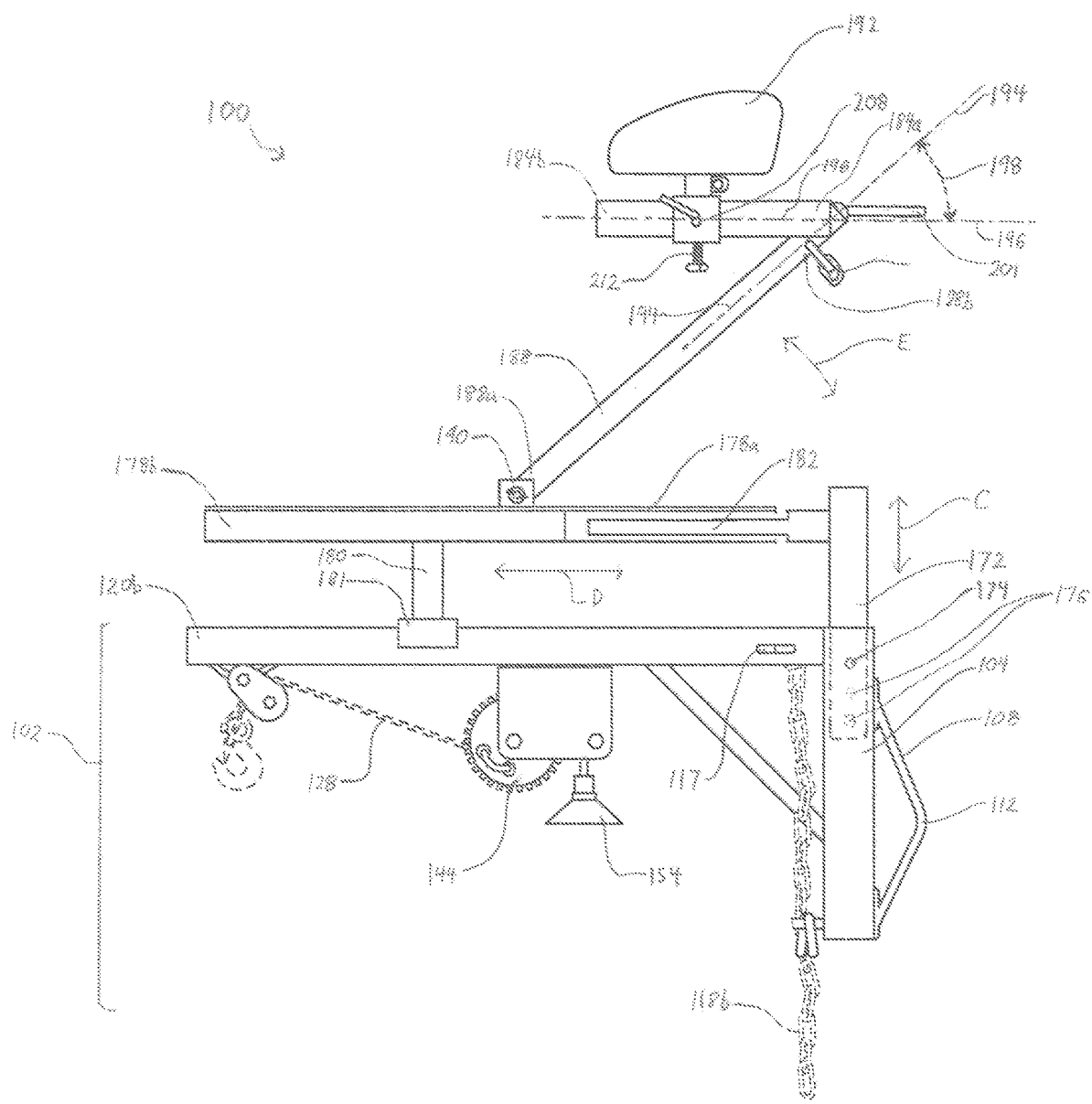
FIG. 6 is a right elevation view of a game feeder hoist and hunting stand having a seat in accordance with embodiments of the invention.
Figure 10:
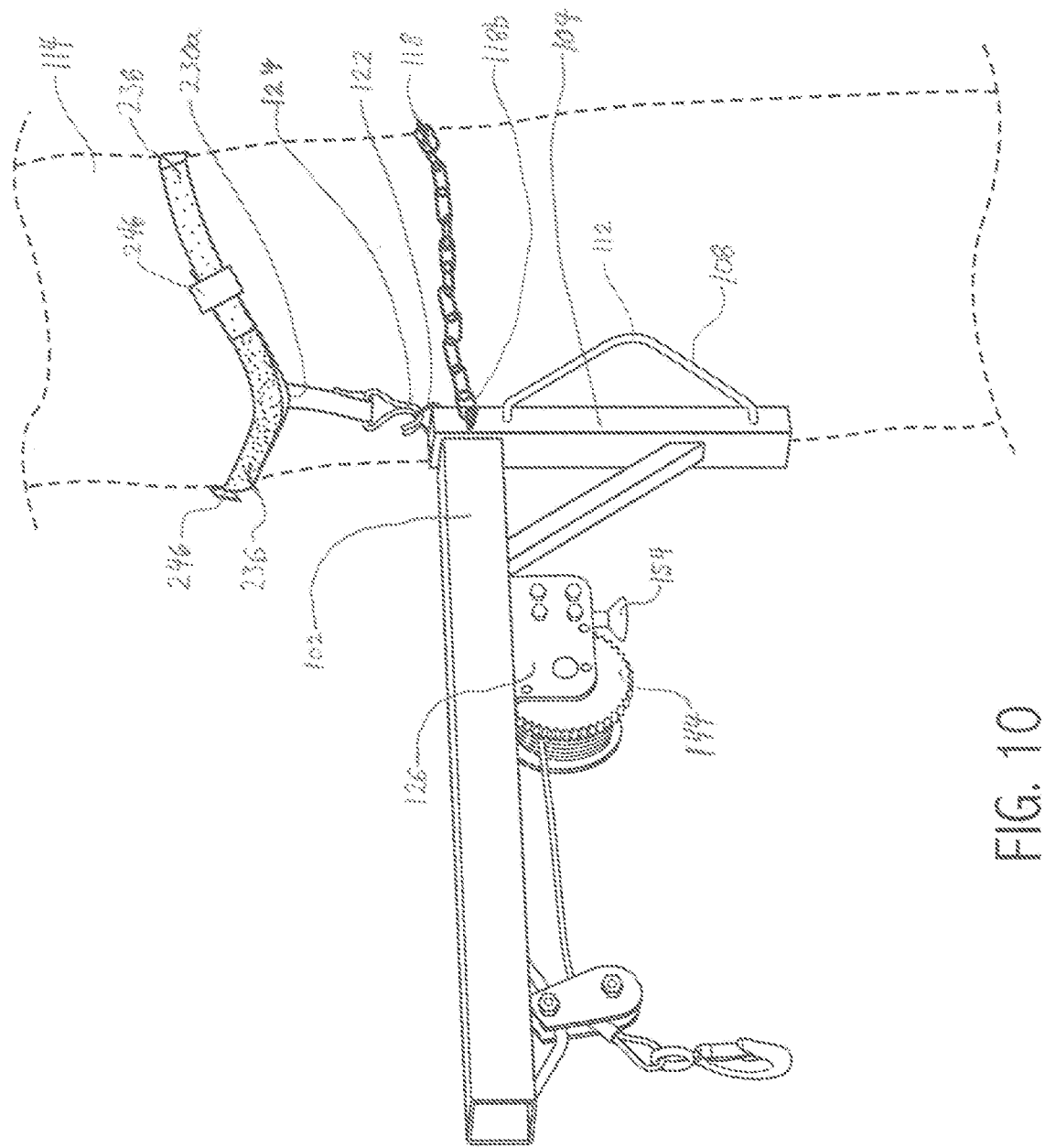
FIG. 10 is a right perspective view of a tree sizing strap for mounting hunting equipment and a game feeder hoist hanging therefrom, attached to an exemplary tree trunk, in accordance with embodiments of the invention.

A horizontal support arm 120 is rigidly connected to the upstanding support member 104 as shown in FIGS. 1-3. The horizontal support arm 120 is preferably welded to the upstanding support member 104. In one embodiment, a diagonal shear support member 121 is connected to and disposed between the upstanding support member 104 and the horizontal support arm 120, to provide additional resistance against shear stresses induced by gravity when the hoist 102 is mounted to a tree 114. Preferably, a second chain mount 117 is rigidly fixed to the upstanding support member 104, or rigidly fixed to the horizontal support arm as illustrated in FIGS. 4 and 6, to releaseably secure the chain 118 to the hoist 102 when encircling the tree 114 as seen in FIG. 10. The weight of the hoist 102, as represented by arrow A in FIG. 2, causes the chain 118 to be forced into engagement with the tree and creates tension in the chain 118. The coupling of these forces thereby secures the hoist 102 to the tree 114 and prevents the hoist 102 from sliding down the tree trunk 114.

In one embodiment, the game feeder hoist 102 can be further secured to the tree 114 by a cinch strap 119, as shown in FIG. 1.

Figure 9:
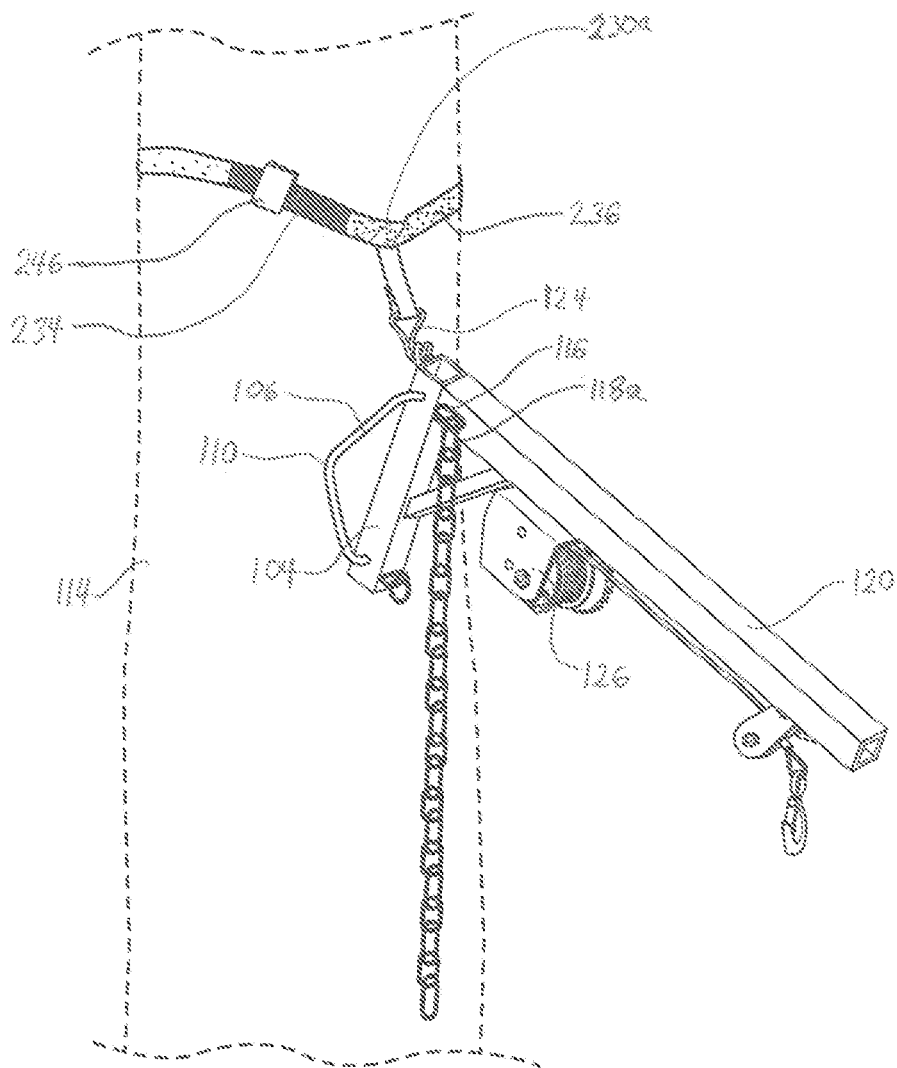
FIG. 9 is a left perspective view of a tree sizing strap for mounting hunting equipment and a game feeder hoist hanging therefrom, attached to an exemplary tree trunk, in accordance with embodiments of the invention.

Preferably, at least one loop mounting member 122 is connected to the upper end 104a of the upstanding support member 104, and the loop mounting member 122 is adapted to receive a hook 124 from which a user or person (U) can temporarily hang the hoist 102 while mounting the hoist 102 to a tree 114 as seen in FIGS. 9-10.

As illustrated in FIGS. 1-4, the horizontal support arm 120 is rigidly connected to the upstanding support member 104 and extends outwardly forwardly from the tree trunk 114 when the hoist 102 is attached to the tree 114. In a preferred embodiment, a winch 126 is removeably attached to the horizontal support arm 120, and as seen in FIG. 1, the winch 126 has a hoist line 128 that extends horizontally (along the direction of arrow B) from the winch 126 through a pulley 130 that is operatively connected to the horizontal support arm 120. The hoist line 128 has a hanger 132, such as an eyelet or a hook, at a distal end of the hoist line 128, for connecting to hunting equipment, such as a deer feeder or an ATV, in order to lift or elevate the equipment relative to the ground when the winch 126 is rotated to wind the hoist line 128.

With reference to FIG. 1, the winch 126 is held in a bracket 134 preferably suspended from a mid-point of the horizontal support arm 120. In one embodiment, the pulley 130 is a double-ended pulley which is hung from a downwardly curved or v-shaped support rod 136 fixed to the horizontal support arm 120. The double ended pulley 130 is preferably suspended from an outer extremity point, or a distal end 120b, of the horizontal support arm 120. In a preferred embodiment, a spotlight 138 is fitted at the end of the support arm 120 as shown in FIGS. 1-2, and the spot light 138 preferably comprises an internal battery electrically connected to an externally mounted solar panel 142 which charges the battery 140. The spotlight 138 is preferably operated by motion, so as to light up an area beneath the portable game feeder hoist (e.g., as exemplified in FIG. 14) upon arrival of persons or game.

Figure 12:
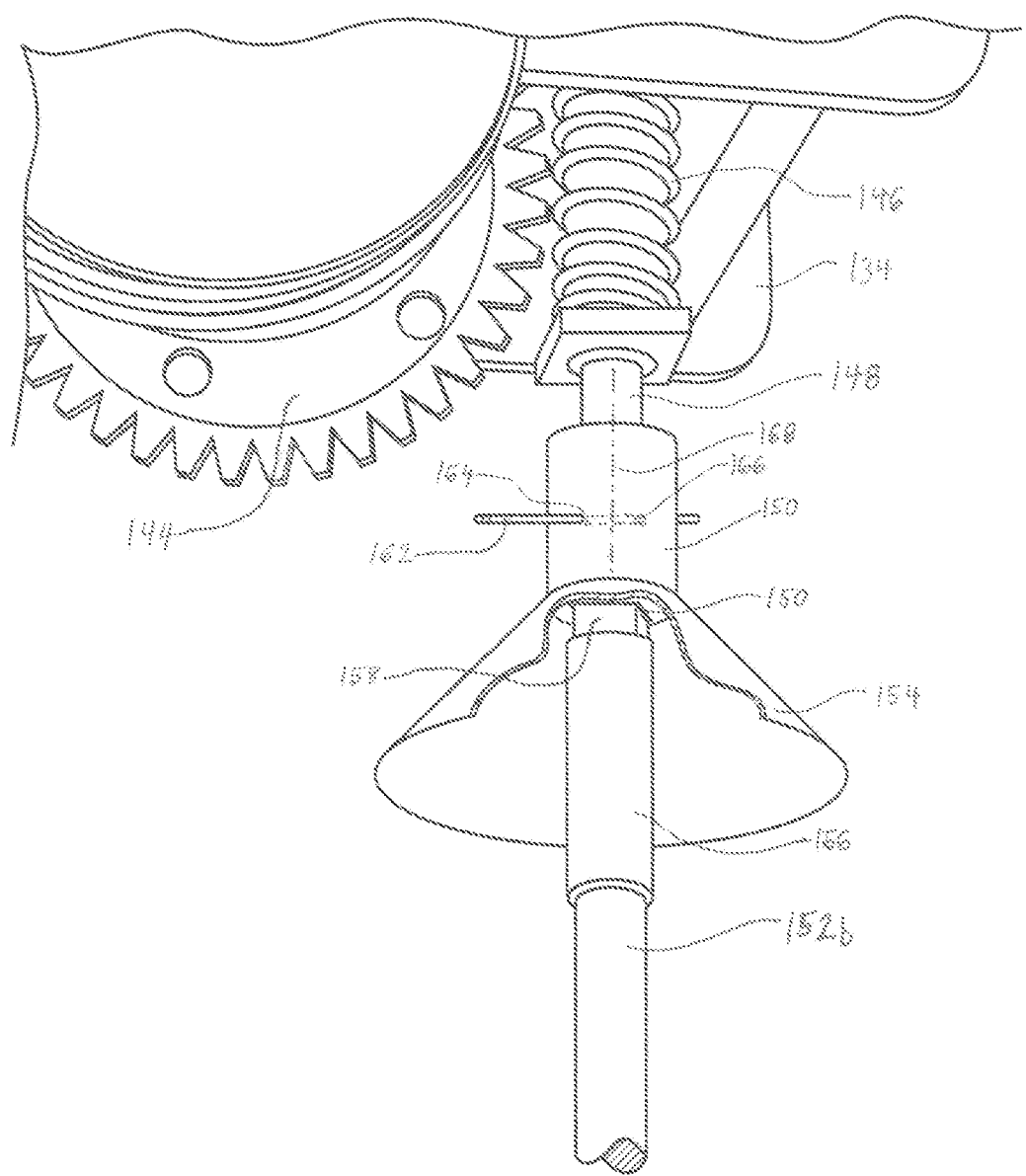
FIG. 12 is a close-up right partly bottom perspective partial cut-away view of a cone guide and an end of a drive shaft in one lock and key style arrangement with a receiving socket removeably connected to the worm gear shaft operatively connected to the worm screw meshed with the worm gear of the winch of a game feeder hoist, in accordance with preferred embodiments of the invention.
Figure 14:
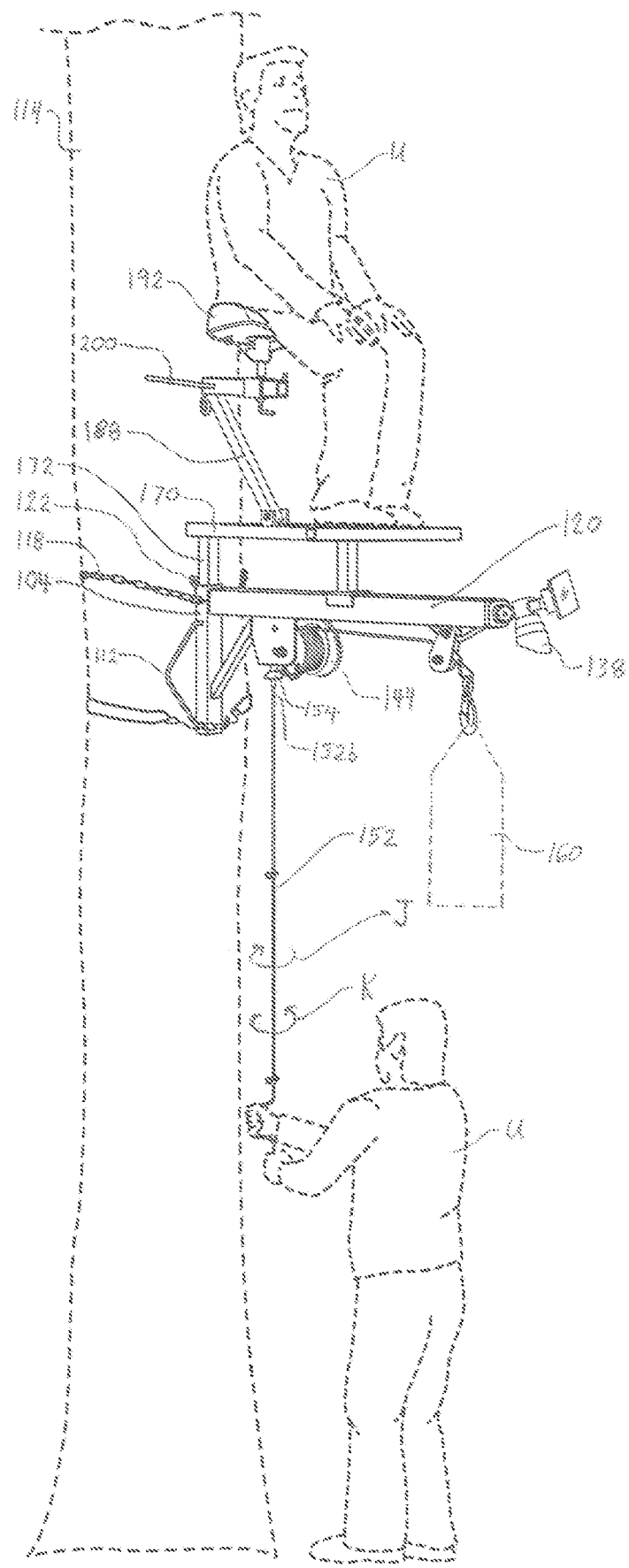
FIG. 14 is a front left perspective view of a game feeder hoist and hunting stand illustrating an exemplary person in a seated position, shown as mounted to an exemplary tree trunk, and illustrating an exemplary person rotating the elongated drive shaft members in accordance with embodiments of the invention.

As seen in FIG. 12, the portable game feeder hoist 102 preferably has a winch 126 comprising a pinion worm gear 144 having teeth meshed with a worm screw 146 operatively coupled to a worm screw shaft 148 configured to removeably connect to a receiving socket 150, and the receiving socket 150 is adapted to securely receive an end of an elongated drive shaft 152, when mounted to the tree 114 and positioned at a height sufficiently out of reach of a standing person, as exemplified in FIG. 14. Through embodiments of the invention, the amount of the force required to lift the desired weight (e.g., the weight of 160) is substantially reduced, as the preferred worm gear winch 126 arrangement can transfer motion in 90 degrees. The worm arrangement disclosed herein also helps to enable the portable game feeder hoist 102 to be considerably smaller in volume and lighter in weight than conventional game feeder lifting devices.

In yet another embodiment, the winch 126 of the portable game feeder hoist 102 comprises an electrically driven motor that is powered by a battery which is electrically connected to a solar panel for charging the battery. For instance, it is disclosed that, in one embodiment, the winch 126 illustrated in FIG. 14 could be configured as an electrically operated winch 126 that is electrically connected to the battery 140 which is charged by the solar panel 142, and that electrically operated winch 126 is preferably operated by a remote control.

Figure 13:
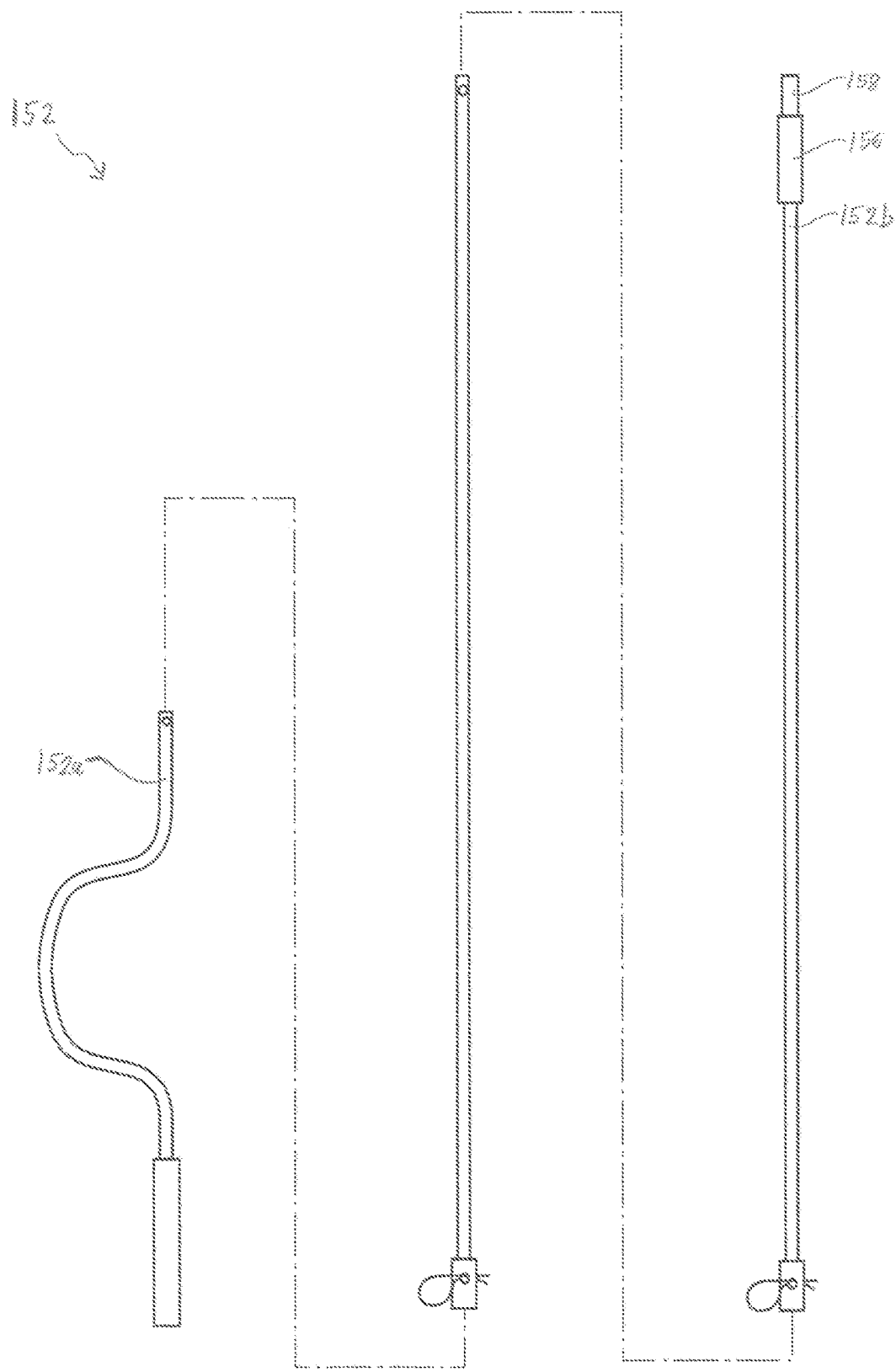
FIG. 13 is an exploded view of elongated drive shaft members adapted to connect to each other to form an extension to drive a winch of the game feeder hoist in accordance with preferred embodiments of the invention.

Referring to FIGS. 12-14, in a preferred embodiment, the portable game feeder hoist 102 comprises an elongated drive shaft member 152 adapted to drive the winch 126 when mounted to the tree 114 and positioned at a height sufficiently out of reach of a standing person, as illustrated in FIG. 14.

Figure 11:
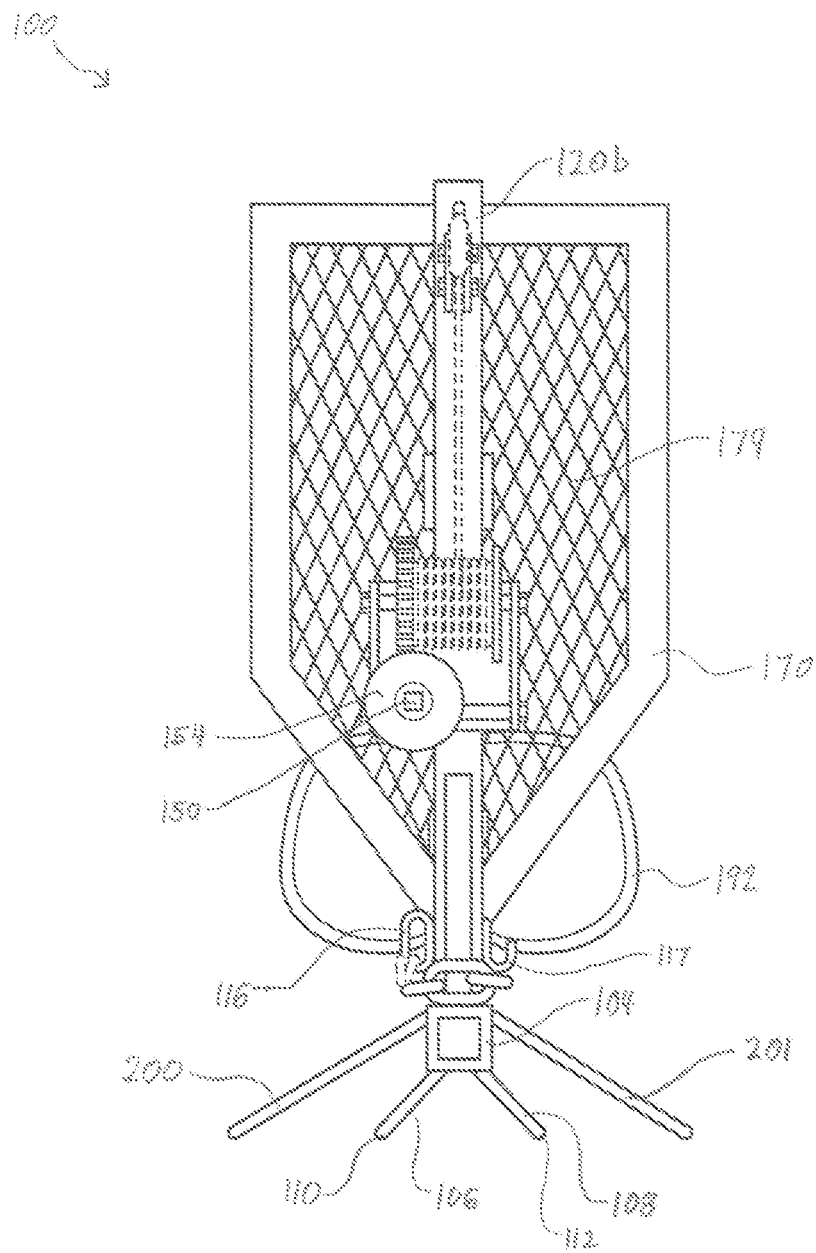
FIG. 11 is a bottom view of a game feeder hoist and hunting stand in accordance with embodiments of the invention.

Referring to FIG. 12, preferably, the distal end 152b of the drive shaft 152 is keyed to fit within the receiving socket 150 in a lock and key style arrangement. In a preferred embodiment, the portable game feeder hoist 102 further comprises a cone guide 154 and receiving socket 150 adapted to receive the distal end 152b of the elongated drive shaft member 152. FIG. 11 shows a bottom view of the portable game feeder hoist and hunting stand 100 including the cone guide 154 and socket 150 adapted to receive the distal end 152b of the drive shaft member 152. Referring to FIGS. 11-14, the cone guide 154 is configured to assist a user (U) by guiding the distal end 152b of the drive shaft 152 into the receiving socket 150.

In a preferred embodiment, as illustrated in FIGS. 12-14, the distal end 152*b* of the drive shaft 152 preferably comprises a drive head 156 and a drive key 158. The receiving socket 150 is preferably adapted to receive the drive key 158 of the drive head 156 disposed at the distal end 152*b* of the drive shaft 152 in a lock and key style arrangement, as illustrated in the close-up view in FIG. 12. For instance, as exemplified in the close-up breakaway view in FIG. 12, the drive key 158 of the drive head 156 of the drive shaft 152 is characterized as square in shape, and the receiving socket 150 is characterized as square in shape, as illustrated in the bottom view in FIG. 11, fitted to closely receive the drive key 158 of the drive shaft member 152 as shown in FIG. 12. In other embodiments, the drive key 158 of the drive head 156 of the drive shaft 152 may be characterized as star in shape, and the receiving socket 150 would be characterized as star in shape, fitted to receive such drive key 158 of the drive shaft member 152. From the disclosure herein, it can be understood that the drive head 156 and drive key 158 can be figured as removable and interchangeable, at the option of the user, which can be important since drive keys 158 fittingly match and mate with respective receiving sockets (e.g., 150). As disclosed herein, it can been seen that embodiments of the invention enable a user to impede unauthorized persons from raising and lowering of the hunting equipment which hangs from the game feeder hoist 102 (such as, for example, the exemplary deer feeder 160 shown in broken lines in FIG. 14), since only authorized users (U) would have the drive key 158 (or alternatively the keyed drive shaft) that fittingly matches the respective receiving socket 150 which is adapted to receive the particular drive key 158 (or alternatively, the keyed drive shaft) in order to operate the winch 126. To permit ease of maintenance as well as efficient interchangeability of the receiving socket 150 at the option of the user, the receiving socket 150 preferably defines a pin channel 164 and is operatively coupled to the worm gear screw shaft 148 with a pin 162 connection extending through the pin channel 164, as shown in FIG. 12. In such preferred embodiment, a bottom end of the worm screw shaft 148 preferably defines a pin channel 166 configured transverse to the longitudinal axis 168 of the worm screw shaft 148, and the receiving socket 150 preferably defines a pin channel 164 configured transverse to the longitudinal axis 168 of the receiving socket 150 as illustrated in FIG. 12, such that when the pin channel 164 of the receiving socket 150 aligns with the pin channel 166 of the worm gear shaft 148, a pin 162 is inserted therethrough so as to connect the receiving socket 150 to the worm gear shaft 148.

In yet another embodiment, the portable game feeder hoist 102 has a plurality of elongated drive shaft members 152, as illustrated in the exploded view in FIG. 13, which are adapted to connect to each other to form an extension to engage and drive the winch 126 of the hoist 102 when the hoist 102 is mounted to the tree 114 and positioned at a height sufficiently out of reach of a standing person as illustrated in FIG. 14. Embodiments of the invention obviate the need for tree-mounted game feeder hoist components to be located within reach of a standing person or within reach of wild game such as a group or passel of hogs as is known in conventional game feeder hoists. Embodiments of the invention avoid the destruction otherwise caused by wild game damaging accessible components of conventional game feeder hoists as well as avoid undesired use by unauthorized persons.

Preferably, the portable game feeder hoist 102 further comprises a portable and removeable hunting stand 170, and the hunting stand 170 preferably includes an elongated vertical support member 172 adapted to be telescopically received in the upstanding support member 104 of the portable game feeder hoist 102 in the direction of arrow C, as illustrated in FIGS. 1, 2, 4, and 6. In the illustrated embodiments, the portable game feeder hoist 102 and removeable hunting stand 170 are telescopic, i.e., the upstanding support member 104 of the portable game feeder hoist 102 preferably comprises a hollow member of which a bottom end of the vertical support member 172 of the removeable hunting stand 170 is adapted to slide freely inside, for insertion and removal, in the direction of arrow C. The upstanding support member 104 and vertical support member 172 are preferably locked together with a locking pin, e.g., exemplary horizontal pin 174 in FIG. 6. As seen in FIG. 6, in one preferred embodiment, a horizontal pin 174 can extend through one of a plurality of aligning apertures 176 of the upstanding support member 104 and vertical support member 172 to support the load (e.g., weight) of the hunting stand 170 at the desired vertical location, or elevation, relative to game feeder hoist 102, at the option of the user. In other words, a user (e.g., U) can adjust the hunting stand 170 upward or downward, relative to the game feeder hoist 102, to a height that is desired by the user. In addition, a user can preferably lock together the upstanding support member 104 and vertical support member 172 by utilizing a dog-bone style automotive trailer towing sleeve hitch lock as the locking pin 174 so as to prevent theft of the removeable hunting stand 170 when unattended by the user (e.g., U). In one embodiment, a user (U) can telescopically insert the vertical support member 172 of the hunting stand into the upstanding support member 104 of the game feeder hoist 102 and lock the hunting stand 170 in an elevated position, relative to the game feeder hoist, with a locking pin, such that the hunting stand 170 is sufficiently above the game feeder hoist 102 to be inaccessible or unusable to an unauthorized user.

In one embodiment, the hunting stand 170 includes a platform 178 having a proximal end 178*a* and a distal end 178*b*, as seen in FIGS. 4 and 6. Preferably, the hunting stand 170 of the portable game feeder hoist 102 has a platform 178 that is rigidly connected to the elongated vertical support member 172, and the platform 178 extends outwardly forwardly relative to the vertical support member 172, as shown in FIGS. 1-4. The platform 179 preferably includes a grated surface 179 as illustrated in FIGS. 3-4. In the illustrated embodiments, the portable game feeder hoist 102 and the hunting stand 170 preferably has a vertical brace arm 180 that is rigidly connected to a bottom part of the platform 178 at a forwardly disposed location relative to the elongated vertical support member 172, where the vertical brace arm 180 supports or upholds the platform 178 by removeably engaging and resting downwardly upon a portion of the horizontal support arm 120, to help bear a portion of the weight of the hunting stand 170. The vertical brace arm 180 preferably includes an inverted-U-shaped coupling 181 which engages the horizontal support arm 120 as shown, for example, in FIGS. 1, 2, 4 and 6.

As illustrated in FIG. 6, in a preferred embodiment, the vertical support member 172 preferably includes a horizontal extension arm 182, and the platform 178 is preferably telescopically connected to the horizontal extension arm 182 of the vertical support member 172, as the proximal end 178*a* of the platform 178 telescopically receives and engages the horizontal extension arm 182 of the vertical support member 172, for adjustably extending and retracting (in the direction of arrow D) the platform 178 outwardly and inwardly relative to the vertical support member 172, which is preferably telescopically received and withdrawn (in the direction of arrow C) into and out of the upstanding support member 104, which is adjacent to a tree trunk, for instance, when the hoist 102 is mounted to the tree 114. In other words, the telescopically connected platform 178 can be adjusted outwardly (forwardly) or inwardly (backwardly) along the direction of arrow D as shown in FIG. 6, relative to the vertical support member 172, enabling a user to adjust the distance and positioning of the platform 170 from and relative to the tree 114. In one embodiment, the horizontal extension arm 182 provides vertical support (against gravitational forces) to the proximal end 178a of the platform 178. In yet another embodiment, the horizontal extension arm 182 provides vertical support (against gravitational forces) to the entire platform 178.

In one embodiment, a vertical pin member can extend through one of a plurality of aligning apertures of the proximal end 178a of the platform 178 and the horizontal extension arm 182 at any point of overlapping connection illustrated in FIG. 6, to lock the platform 178 to the extension arm for resistance against horizontal movement of the platform 178 relative to the extension arm 182, at the option of the user. In addition, the telescopically connected platform 178 can be removed, from the horizontal extension arm 182, at the option of the user. In addition, as noted above addition, the telescopically connected vertical support member 172 of the hunting stand 170 can be adjusted, along the direction of arrow C, and can be removed, at the option of the user, from the upstanding support member 104.

As the elongated vertical support member 172 of the hunting stand 170 is removeably connected and telescopically received into and removed from the upstanding support member 104 of the game feeder hoist 102, along the direction of arrow C as shown in FIG. 4, a user (U) such as a hunter can easily remove the hunting stand 170 from the game feeder hoist 102 to relocate the hunting stand 170 to a location of another game feeder hoist 102, where the hunter can easily and efficiently remount the hunting stand 170 by simply telescopically inserting the elongated vertical support member 172 of the hunting stand 170 into the upstanding support member 104 of the other game feeder hoist 102, thereby obviating the need for the hunter (U) to always carry tree mounting equipment in order to mount a hunting stand to a tree. In addition, by removing the hunting stand 170 from the game feeder hoist 102 through embodiments of the invention, a the invention enables a user to eliminate or reduce the likelihood of unauthorized persons sitting atop the portable game feeder hoist and hunting stand 100. As disclosed herein, the hunting stand 170 can be efficiently carried from one location to another, at the option of the user.

Referring to FIGS. 1-6, the game feeder hoist 102 and the hunting stand 170 preferably comprises a seat 192 upheld by a seat support member 184 pivotally connected to the platform 178 by a pivoting connecting member 188 which pivotally connects the seat support member 184 to the platform 178. The pivoting connecting member 188 has a proximal end 188a opposite a distal end 188b. The seat support member 184 has a proximal end 184a opposite a distal end 184b. Preferably, the distal end 188b of the pivoting connecting member 188 is rigidly connected to the proximal end 184a of the seat support member 184. At the proximal end 188a of the pivoting connecting member 188, a load bearing connection pin 190 pivotally supports the pivoting connecting member 188, such that the seat support member 184 and seat 192 can pivot about the pin 190 in the direction of arrow E shown in FIGS. 1 and 6.

As illustrated in FIG. 2, the pivoting connecting member 188 can be pivoted in the direction of arrow F to lay flat atop the hunting platform 178, as a collapsed position, at the option of the user, providing the user unobstructed and convenient access to the platform 178, when climbing up onto the platform 178 and when standing on the platform 178. Moreover, the collapsed position also provides a convenient manner for the user to carry the hunting stand 170 when the stand 170 is removed from the game feeder hoist 102. In addition, the collapsed position also provides the user a convenient manner to handle the hunting stand 170 during the user's installation of the hunting stand 170 with the game feeder hoist 102 (in the direction of arrows C and/or D) as well as during the user's removal of the hunting stand 170 from the game feeder hoist 102 (in the direction of arrows C and/or D). Embodiments of the invention enable a user to adjust the height and position of the seat 192 to a comfortable position, as desired by the user, without requiring the user to adjust the height or positioning of the game feeder hoist 102 that is mounted to the tree 114.

In one embodiment, the distal end 188b of the pivoting support member 188 transitions to the proximal end 184a of the seat support member 184 at an angle of 90 degrees, as illustrated in FIG. 2. In other words, as seen in the embodiments in FIG. 2, the pivoting connecting member 188 has an axis 194 that is perpendicular to an axis 196 of the seat support member 184. Referring to FIG. 6, in a preferred embodiment, the distal end 188b of the pivoting support member 188 transitions to the proximal end 184a of the seat support member 184 at an angle 198 of 40 degrees as illustrated in FIG. 6. In other words, the pivoting connecting member 188 has an axis 194 that is at an angle 198 of 40 degrees to axis 196 of the seat support member 184. Preferably, angle 198 is fixed between 20 degrees and 90 degrees in embodiments of the invention.

As illustrated in FIGS. 2-3, in a preferred embodiment, at least one opposing pair of lateral support arms 200, 201 are rigidly connected to the proximal end 184a of the seat support member 184, and each arm 200, 201 laterally extends outwardly rearwardly for engaging an adjacent segment of the tree trunk 114 when pivoted (arrow E) upward into the seated position as illustrated in FIGS. 1 and 14. Embodiments of the invention obviate the need for piercing the trunk of the tree with sharp penetrating pointed objects or blades in order to provide stability when mounted to a tree.

In addition, in one embodiment, an eyelet 199 is disposed near the distal end 188b of the pivoting connecting member 188, and the eyelet 199 is configured to receive a chain or strap encircling the tree 114, at the option of the user.

Figure 5:
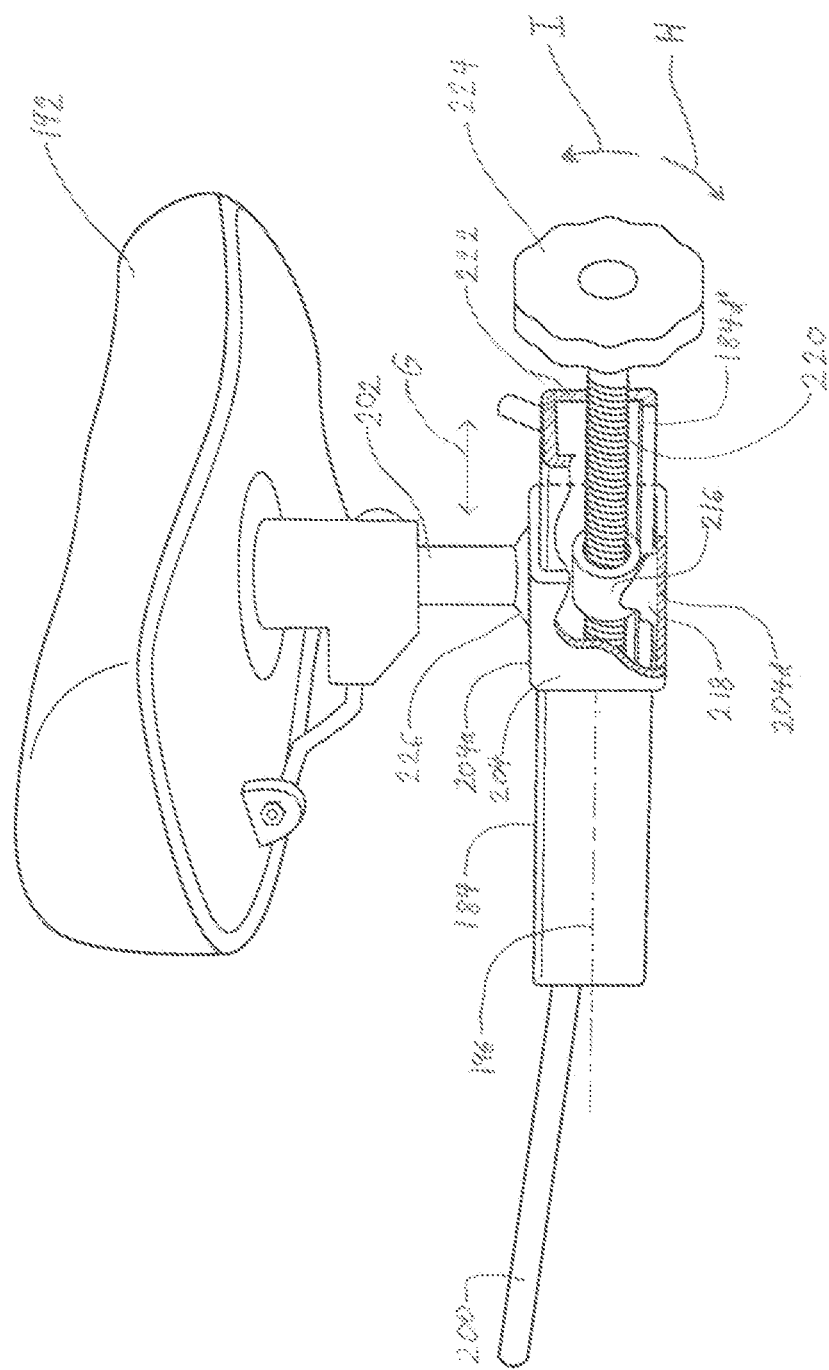
FIG. 5 is a front left perspective close-up partial cut-away view of a seat support member, seat, and seat mount assembly, in accordance with preferred embodiments of the invention.

Referring to FIGS. 3-5, the seat 192 is preferably disposed atop a stanchion 202 that is fixed to a tubular gliding sleeve 204 that is configured to envelope a portion of the seat support member 184. The seat support member 184 is glidingly engaged by the tubular gliding sleeve 204 which is configured to glide along the seat support member 184 in the direction of arrow G. The tubular gliding sleeve 204 is preferably configured in coaxial alignment with the seat support member 184 along axis 196. In other words, the tubular gliding sleeve 204 and seat 192 can slide forward and backward relative to the seat support member 184 as illustrated by arrow G in FIGS. 1, 3 and 5, and as further described herein, the tubular gliding sleeve 204 can lock in place by rotating a handle or knob 224 to lock the tubular gliding sleeve 204 into place onto the seat support member 184. The seat 192 is slideably upheld by the seat support member 184.

As illustrated in FIG. 4, in one embodiment, a side-wall 204c of the tubular gliding sleeve 204 defines at least one aperture 206 having internal threads, and the tubular gliding sleeve 204 has a threaded locking bolt 208 positioned substantially perpendicular to the side-wall of the tubular gliding sleeve 204 and configured to rotate through the aperture 206 to horizontally engage a side 184c of the seat support member 184 that is positioned within the tubular gliding sleeve 204, to prevent sliding movement of the gliding sleeve 204 and seat 192 relative to the seat support member 184. In other words, rotating the locking bolt 208 through the aperture 206 thereby locks the seat support member 184 within the tubular gliding sleeve 204, which means that it prevents the independent gliding movement (illustrated by arrow G in FIGS. 1, 3 and 5) of the seat 192 relative to the seat support member 184. A hand grip 210 is attached to an outer end of the locking bolt 208 disposed outside the gliding sleeve 204, where the hand grip 210 is configured to receive the grasp of a user for rotating the locking bolt 208 through the aperture 206 to engage the seat support member 184 within the gliding sleeve 204.

As further illustrated in FIG. 4, in one embodiment, a bottom-wall 204d of the tubular gliding sleeve 204 defines at least one aperture having internal threads, and the tubular gliding sleeve 204 has a threaded locking bolt 212 positioned substantially perpendicular to the bottom-wall of the tubular gliding sleeve 204 and configured to rotate through the aperture to vertically engage a bottom-side 184d of the seat support member 184 that is positioned within the tubular gliding sleeve 204, to prevent sliding movement of the gliding sleeve 204 and seat 192 relative to the seat support member 184. In other words, rotating the locking bolt 208 through the aperture thereby locks the seat support member 184 within the tubular gliding sleeve 204, which means that it prevents the independent gliding movement (illustrated by arrow G in FIGS. 1, 3 and 5) of the seat 192 relative to the seat support member 184. A hand grip 214 is attached to an outer end of the locking bolt 212 disposed outside the gliding sleeve 204, configured to receive the grasp of a user for rotating the locking bolt 208 through the aperture 206 to engage the seat support member 184 within the gliding sleeve 204.

Referring to FIG. 5, in a preferred embodiment, the seat support member 184 is preferably in the form of an inverted substantially "U" shaped tubular support member, and the tubular gliding sleeve 204 fully envelops a portion of the inverted substantially "U" shaped tubular support member 184 having a notched bottom wall 184d'. As shown in FIG. 5, an internally threaded traveler receptacle 216 is fixed (e.g., welded) 218 to an interior surface of the bottom wall 204d of the tubular gliding sleeve 204. As seen in FIG. 5, a rotary screw shaft 220 and knob 224 are positioned substantially concentric with the seat support member 184, for driving the traveler receptacle 216 longitudinally along axis 196, and in turn, the rotary screw shaft 220 moves the tubular gliding sleeve 204 and connected seat 192 forwardly and rearwardly along the direction of arrow G in FIGS. 1, 3 and 5. Preferably, the rotary screw shaft 220 is fixably disposed between and abutting against opposing transverse walls 222 of the seat support member 184 such that turning the knob 224 and rotary screw shaft 220 in the clockwise direction (arrow H in FIG. 5) moves the tubular gliding sleeve 204 and connected seat 192 forwardly relative to the seat support member 184, and turning the knob 224 and rotary screw shaft 220 in the counter-clockwise direction (arrow I in FIG. 5) moves the tubular gliding sleeve 204 and connected seat 192 rearwardly relative to the seat support member 184. In other words, turning the handle 224 clockwise (in the direction of arrow H) would propel the seat 192 forward (towards the handle 224), and turning the handle counterclockwise (in the direction of arrow I) would propel the seat backwards (away from the handle 224).

Thus, the threaded traveler receptacle 216 engaging the rotary screw shaft 220 may be driven to reciprocate and adjust the seat 192, at the option of the user, to the user's desired position relative to seat support member 184 and abutting tree 114 when in the seated position. Exemplary seated positions are illustrated in FIGS. 1 and 14.

In one embodiment, the stanchion 202 is fixed (e.g., welded) 226 to the top 204a of the tubular gliding sleeve 204 as illustrated in FIG. 5. In another embodiment, the stanchion 202 is operatively coupled 226 to the top 204a of the tubular gliding sleeve 204 and configured to oscillate, such that the seat 192 can oscillate relative to the seat support member 184.

As is commonly known in the art, game feeders (e.g., 160) are reservoirs that dispense food (and may be automated to do so), such as corn or other food material, from a lower end thereof in order to attract wild game such as deer and hogs. Hunters frequently find it difficult to estimate the size of the trunks of trees 114 from which they would like to hang a deer feeder or to mount a deer stand. Embodiments of the invention are particularly well suited for helping hunters approximate the size of tree trunks while hunting and for facilitating a user's installation of deer feeder hoists as well as facilitating the installation of a hunting stands.

Referring to FIGS. 7-10, embodiments of the invention provide for a tree sizing strap and hook device 228 that provides a visual tool to which mounting structures, such as trees and posts, can be compared to help hunters determine whether the size of a particular tree or post is adequate for hanging a deer feeder hoist or for mounting a hunting stand.

Figure 8:
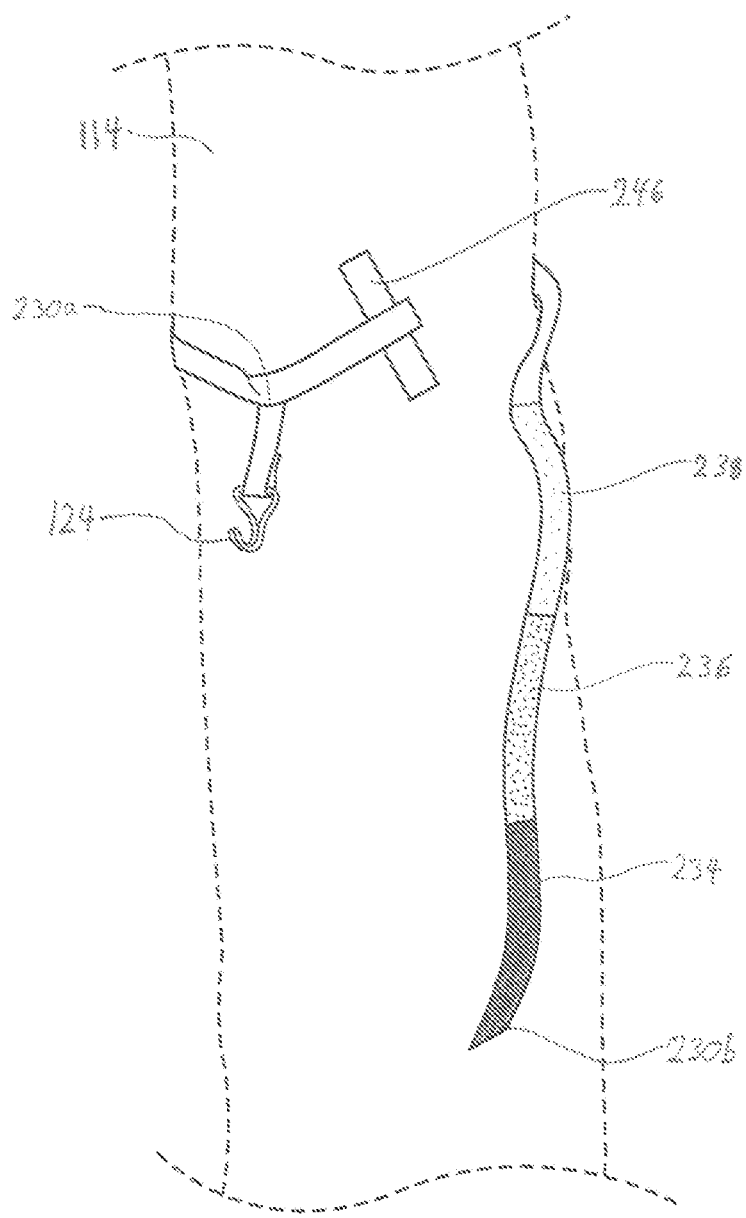
FIG. 8 is a right perspective view of a tree sizing strap for mounting hunting equipment and an exemplary tree trunk in accordance with embodiments of the invention.

In a preferred embodiment, the portable game feeder hoist and hunting stand system 100 includes an elongated flexible tree sizing strap 230 having a hook 124 attached to it for temporarily mounting the hoist 102 to a tree 114, and the strap 124 is configured to encircle a trunk of the tree 114 as illustrated in FIG. 8 and to overlie itself in such encircled position as illustrated in FIGS. 9-10. The strap 230 has a proximal end 230a opposite a distal end 230b and an inner surface 230c relative to an outer surface 230d in the encircled position. In a preferred embodiment, the hook 124 is operatively connected to the proximal end 230a of the flexible strap 230 and is adapted to receive hunting equipment such as the portable game feeder hoist 102 as shown in FIG. 9. Preferably, the outer surface 230d of the strap 230 has a Velcro liner, and the inner surface 230c has a Velcro liner that is adapted to mate with the outer surface 230d Velcro liner, for maintaining an encircled position around the tree trunk as illustrated in FIGS. 9-10.

Figure 7:
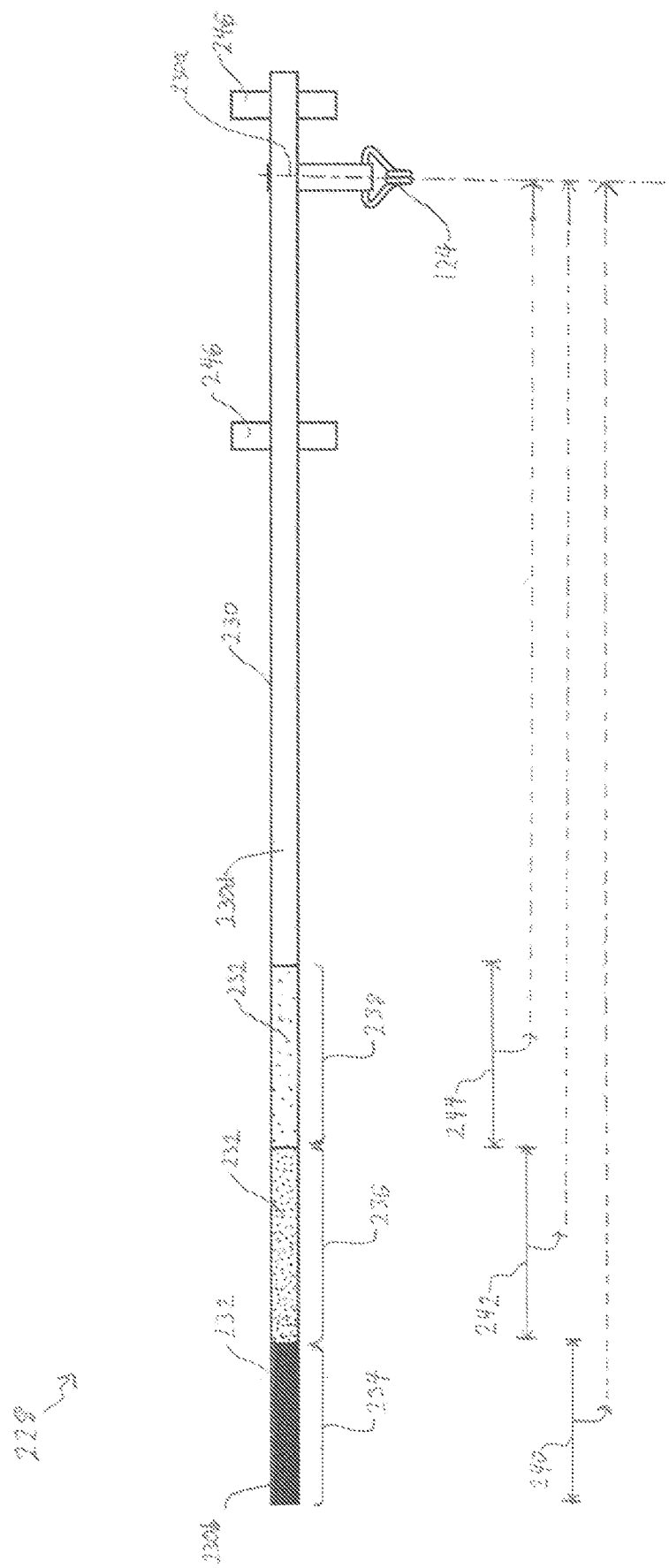
FIG. 7 is a front elevation view of a tree sizing strap for mounting hunting equipment in accordance with embodiments of the invention.

Referring to FIGS. 7-8, the strap 230 preferably includes graphic identification markers 232 affixed to the outer surface 230d of the strap, and the markers have a plurality of visual zones 234, 236, 238 wherein each visual zone 234, 236, 238 includes a respective physical range of measurement 240, 242, 244 relative to the proximal end 230a of the strap 230 and a respective color that differ from other ones of the visual zones, for visual identification of diameter characteristics of the tree trunk 114 or post as illustrated in FIG. 8.

Referring to FIG. 8, in one preferred embodiment, the plurality of visual zones includes a first visual zone 234 and a second visual zone 236 configured such that, in the encircled position, the first visual zone 234 overlapping the proximal end 230a of the strap signifies an excessive tree trunk 114 size relative to the mounting ability characteristics of the hunting equipment, such as the length of chain 118 attached to the game feeder hoist 102. In other words, for instance, when the first visual zone 234 overlaps the proximal end 230a of the tree sizing strap 230, then that signifies to the user that the fixed length of chain 118 of the portable game feeder hoist 102 is of insufficient or inadequate length to encircle the tree trunk 114 due to the first visual zone 234 having range of length 240 relative to the proximal end 230a of the tree sizing strap 230 as seen in FIG. 7. In such instance, the length of the circumference of the tree trunk 114 is within the range of length 240.

Preferably, the second visual zone 236 overlapping the proximal end 230a signifies adequate tree trunk 114 size relative to such mounting ability characteristics of the hunting equipment. The characteristics of the hunting equipment include a length of chain 118 fixed to a game feeder hoist 102 (or hunting stand) as illustrated in FIG. 10.

In yet another preferred embodiment, the plurality of visual zones includes a first visual zone 234, a second visual zone 236, and a third visual zone 238. The first 234, second 236, and third 238 visual zones are configured such that, in the encircled position, the first visual zone 234 overlapping the proximal end 230a signifies that the tree trunk 114 size is excessive, or too large, relative to the mounting ability characteristics of the hunting equipment, such as the fixed length of chain 118 attached to the game feeder hoist 102; in other words, the first visual zone 234 overlapping the proximal end 230a signifies that the tree trunk 114 size is excessive or too large because to the first visual zone 234 has range of length 240 relative to the proximal end 230a as seen in FIG. 7 and the circumference of the tree trunk 114 is within the range of length 240. The visual zones are further configured such that the second visual zone 236 overlapping the proximal end 230a signifies adequate tree trunk size relative to the mounting ability characteristics of said hunting equipment. In other words, for instance, when the second visual zone 236 overlaps the proximal end 230a of the strap 230, that signifies to the user that the fixed length of chain 118 of the portable game feeder hoist 102 is of sufficient or adequate length to encircle the tree trunk 114, due to the second visual zone 236 having range of length 242 relative to the proximal end 230a as seen in FIG. 7, and in such instance, the length of the circumference of the tree trunk 114 is within the range of length 242.

For instance, FIG. 10 illustrates visual zone 236 overlapping the proximal end 230a of the tree sizing strap 230, which signifies to the user that the fixed length of chain 118 of the portable game feeder hoist 102 is of sufficient or adequate length to encircle the tree trunk 114; and accordingly, as can be seen in FIG. 10, the chain 118 of the portable game hoist 102 can be easily wrapped around the trunk of a tree 114 by a user in order to securely mount the game feeder hoist 102 to the tree trunk 114 while the game feeder hoist 102 hangs from the hook 124 of the tree sizing strap 230.

Preferably, the visual zones are further configured such that the third visual zone 238 overlapping the proximal end 230a of the strap 230 signifies to the user that the tree trunk 114 has an insufficient tree trunk size relative to the mounting ability characteristics and requirements of the hunting equipment. For instance, in other words, when the third visual zone 238 overlaps the proximal end 230a of the tree sizing strap 230, that signifies to the user that the size and respective strength of the tree trunk 114 is likely to be insufficient to bear the intended load of the intended hunting equipment such as the game feeder hoist 102, due to the third visual zone 238 having range of length 244 relative to the proximal end 230a as seen in FIG. 7, and in such instance, the length of the circumference of the tree trunk 114 is within the range of length 244.

For purposes of clarity, as illustrated in FIG. 7, relative to the proximal end 230a of the tree sizing strap 230, range of length 244 is shorter than range of length 242; and range of length 242 is shorter than range of length 240.

In a preferred embodiment, each of the visual zones 234, 236, 238 is a different color. In yet another preferred embodiment, one of the visual zones is red, one of the visual zones is green, and one of the visual zones is yellow.

As shown in FIGS. 7-8, in one embodiment, the tree sizing strap 230 further comprises a hook 124 for temporarily hanging the game feeder hoist 102 from the encircled tree 114 while the user wraps the chain 118 around the tree trunk and connects it to the chain mount 117; and preferably, the tree sizing strap 230 comprises transverse strap flaps 246 configured to enwrap a portion of the tree sizing strap 230 when in the encircled position, such as the encircled position illustrated in FIG. 10.

Referring to FIG. 14, a game feeder hoist and hunting stand device 100 is shown illustrating one exemplary user (U) standing on the ground and rotating the elongated drive shaft 152 to operate the game feeder hoist 102 and also illustrating an exemplary user positioned in seated position atop the hunting stand 170. As shown in FIGS. 13-14, the portable game feeder hoist 102 preferably includes a plurality of elongated drive shaft members 152 adapted to removeably connect to each other to form an extension to drive the winch 126 of the game feeder hoist 102 when mounted to the tree 114 and positioned at a height sufficiently out of reach of person standing on the ground. As can be seen, the elongated drive shaft members 152 allow the user to adjust to meet the height of the mounted hoist 102 when the hoist is mounted to a tree 114 at an elevated position behind arms-length reach of the person, as seen in FIG. 14. For example, as the user rotates the elongated drive shaft 152 in the direction illustrated by arrow J, and thereby drives the winch, the exemplary deer feeder 160 is hoisted upward relative to the ground. As the user rotates the elongated drive shaft 152 in the direction illustrated by arrow K to drive the winch, the exemplary deer feeder 160 is hoisted downward, or lowered, relative to the ground.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:
1. A portable game feeder hoist comprising:
   an upstanding support member having an upper end and a lower end;
   at least one opposing pair of lateral support arms rigidly connected to said upstanding member wherein each arm laterally extends outwardly rearwardly and transitions inwardly forwardly to form a lateral support elbow for the upstanding support member;

at least one chain mount rigidly connected to said upstanding support member and configured to secure a chain;

at least one loop mounting member connected to the upper end of the upstanding support member and adapted to receive a hook from which to temporarily hang the hoist while mounting said hoist to a tree;

a horizontal support arm rigidly connected to the upstanding support member extending outwardly forwardly therefrom;

a winch removeably attached to the horizontal support arm, said winch comprising a hoist line extending horizontally from said winch through a pulley operatively connected to said horizontal support arm, said hoist line having a hanger at a distal end thereof, said hanger adapted to attach to a game feeder when said winch is rotated to wind said hoist line thereon; and a hunting stand comprising an elongated vertical support member telescopically received in the upstanding support member, a platform connected to the elongated vertical support member extending outwardly forwardly therefrom, and a vertical brace arm rigidly connected to a part of the forwardly disposed platform and resting downwardly upon a portion of the horizontal support arm.

2. The portable game feeder hoist of claim 1, wherein said platform is telescopically connected to said elongated vertical support member for extending said platform outwardly from a tree trunk when said hoist is mounted thereto.

3. The portable game feeder hoist of claim 1, further comprising a seat support member pivotally connected to the platform by a pivoting connecting member.

4. The portable game feeder hoist of claim 1, wherein said winch comprises a worm gear meshed with a worm screw operatively coupled to a worm screw shaft configured to removeably connect to a receiving socket, wherein said receiving socket is adapted to securely receive an end of an elongated drive shaft.

5. The portable game feeder hoist of claim 4, wherein said end of the elongated drive shaft is keyed to fit within said receiving socket in a lock and key style arrangement.

6. The portable game feeder hoist of claim 1, further comprising a cone guide and receiving socket adapted to receive a distal end of an elongated drive shaft member.

7. The portable game feeder hoist of claim 5, further comprising an elongated drive shaft member adapted to drive the winch when mounted to said tree and positioned at a height sufficiently out of reach of a standing person.

8. The portable game feeder hoist of claim 5, further comprising a plurality of elongated drive shaft members adapted to connect to each other to form an extension to drive the winch when mounted to said tree and positioned at a height sufficiently out of reach of a standing person.

9. The portable game feeder hoist of claim 1, further comprising a tree sizing strap comprising a hook attached thereto for temporarily mounting the hoist to a tree, said strap configured to encircle a trunk of the tree and to overlie itself in said encircled position, said strap further comprising graphic identification markers affixed to an outer surface of the strap, said markers having a plurality of visual zones wherein each visual zone comprises a physical range of measurement and a color that differ from other ones of the visual zones for visual identification of diameter characteristics of said tree trunk.

10. The portable game feeder hoist of claim 1, further comprising a solar charged spotlight removeably fitted at a distal end of the horizontal support arm of said portable game feeder hoist, said spotlight operated by motion, so as to light up an area beneath said portable game feeder hoist upon arrival of persons or game.

11. The portable game feeder hoist of claim 1, wherein the winch comprises an electrically driven motor powered by a battery electrically connected to a solar panel for charging said battery.

12. A portable tree stand system comprising:

an upstanding support member having an upper end and a lower end;

at least one opposing pair of lateral support arms rigidly connected to said upstanding member wherein each arm laterally extends outwardly rearwardly and transitions inwardly forwardly to form a lateral support elbow for the upstanding support member;

at least two chain mounts rigidly connected to said upstanding support member and configured to secure a chain;

a chain having a first end and a second end, the first end of the chain secured to the first chain mount on one first side of the upstanding support member, the second end of the chain removeably secured to the second chain mount disposed upon the other, second side of the upstanding support member, for releaseably encompassing a tree trunk;

at least one loop mounting member connected to the upper end of the upstanding support member and adapted to receive a hook from which to temporarily hang the upstanding support member while mounting said upstanding support member to a tree;

a horizontal support arm rigidly connected to the upstanding support member extending outwardly forwardly therefrom;

a removeable hunting stand platform comprising an elongated vertical support member telescopically received in the upstanding support member wherein said platform extends outwardly forwardly therefrom, a vertical brace arm rigidly connected to a part of the forwardly disposed platform and resting downwardly upon a portion of the horizontal support arm, wherein said platform is telescopically connected to said elongated vertical support member for extending said platform outwardly from a tree trunk when said hoist is mounted thereto, said hunting stand further comprising a seat support member pivotally connected to the platform by a pivoting connecting member for pivoting the seat upward to a seated position and folding the seat downward to a transport position.

* * * * *